US010272859B2

(12) United States Patent
Miller et al.

(10) Patent No.: US 10,272,859 B2
(45) Date of Patent: Apr. 30, 2019

(54) TRAILER WITH REAR IMPACT GUARD

(71) Applicant: STI Holdings, Inc., Stoughton, WI (US)

(72) Inventors: Daniel Patrick Miller, Madison, WI (US); Francis Steven Smidler, Stoughton, WI (US)

(73) Assignee: STI Holdings, Inc., Stoughton, WI (US)

( * ) Notice: Subject to any disclaimer, the term of this patent is extended or adjusted under 35 U.S.C. 154(b) by 28 days.

(21) Appl. No.: 15/712,668

(22) Filed: Sep. 22, 2017

(65) Prior Publication Data

US 2018/0009401 A1 Jan. 11, 2018

Related U.S. Application Data

(63) Continuation of application No. 15/240,237, filed on Aug. 18, 2016, now Pat. No. 9,771,040.
(Continued)

(51) Int. Cl.
*B60R 19/24* (2006.01)
*B60R 19/56* (2006.01)
(Continued)

(52) U.S. Cl.
CPC .............. *B60R 19/24* (2013.01); *B60R 19/56* (2013.01); *B62D 25/08* (2013.01); *B62D 33/04* (2013.01); *B62D 53/06* (2013.01)

(58) Field of Classification Search
CPC ... B60R 19/24; B60R 19/56; B60R 2019/247; B60R 2021/002; B62D 33/04; B62D 53/06
(Continued)

(56) References Cited

U.S. PATENT DOCUMENTS 3,871,695 A 3/1975 Koenig
4,359,239 A 11/1982 Eggert, Jr.
(Continued)

FOREIGN PATENT DOCUMENTS

CA 2218514 10/1996
CA 2240821 1/1999
(Continued)

OTHER PUBLICATIONS

Trailer Update: A Vehicle for Every Haul, Jul. 2015 see p. 9-10, Vanguard National (17 pages).
(Continued)

*Primary Examiner* — Gregory A Blankenship
(74) *Attorney, Agent, or Firm* — Michael Best & Friedrich LLP

(57) ABSTRACT

A trailer frame includes a rear bolster, cross-members, and corner gussets extending forwardly from ends of the rear bolster. A rear impact guard includes a bumper positioned at the rear end of the trailer and spaced below the rear bolster, pair of outboard posts, and at least one inboard post. The outboard posts extend between the bumper and the rear bolster adjacent respective opposed distal ends of the bumper, and the inboard post extends between the bumper and the rear bolster between the outboard posts. Each of the pair of outboard posts has a lower end that overlaps with a respective mounting bracket that protrudes upwardly toward the rear bolster from the bumper such that mounting holes of the outboard posts align with mounting holes of the mounting brackets. A laterally-outboard panel of each mounting bracket extends obliquely from the bumper in a direction with a laterally-outward component.

20 Claims, 14 Drawing Sheets

Related U.S. Application Data

(60) Provisional application No. 62/311,695, filed on Mar. 22, 2016, provisional application No. 62/206,653, filed on Aug. 18, 2015, provisional application No. 62/206,661, filed on Aug. 18, 2015.

(51) Int. Cl.
*B62D 25/08* (2006.01)
*B62D 33/04* (2006.01)
*B62D 53/06* (2006.01)

(58) Field of Classification Search
USPC .................................. 293/138, 154, 155
See application file for complete search history.

(56) References Cited

U.S. PATENT DOCUMENTS

| | | | |
|---|---|---|---|
| 4,514,002 A | 4/1985 | McIntosh | |
| 5,507,546 A | 4/1996 | Holley | |
| 5,632,518 A | 5/1997 | Kendall | |
| 5,673,953 A | 10/1997 | Spease | |
| 6,076,871 A | 6/2000 | Jarvis et al. | |
| 6,089,629 A | 7/2000 | Hope et al. | |
| 6,109,675 A | 8/2000 | Sumrall | |
| 6,116,667 A | 9/2000 | Torcomian | |
| 6,176,529 B1 | 1/2001 | Kitzmiller et al. | |
| 6,264,258 B1 | 7/2001 | Li et al. | |
| 6,604,765 B1 | 8/2003 | Eull | |
| 6,626,475 B2 | 9/2003 | Schroeder | |
| 6,652,010 B1 | 11/2003 | Huddle et al. | |
| 6,764,116 B2 | 7/2004 | Ledford et al. | |
| 6,799,783 B2 | 7/2004 | Gollungberg et al. | |
| 6,962,378 B2 | 11/2005 | Ledford et al. | |
| 6,974,166 B2 | 12/2005 | Ledford et al. | |
| 7,086,674 B2 | 8/2006 | Goertz | |
| 7,188,875 B2 | 3/2007 | Norelius | |
| 7,284,788 B1 | 10/2007 | Barbat et al. | |
| 7,407,204 B2 | 8/2008 | Eriksson et al. | |
| 7,455,337 B2 | 11/2008 | Andersson | |
| 7,527,309 B2 | 5/2009 | Smidler | |
| 7,530,612 B2 | 5/2009 | Regnell et al. | |
| 7,900,983 B2 | 3/2011 | Saitou | |
| 7,950,705 B2 | 5/2011 | Saitou | |
| 8,100,465 B2 | 1/2012 | Wylezinski | |
| D703,106 S | 4/2014 | Deighton | |
| 8,714,792 B2 | 5/2014 | Adams | |
| 8,950,793 B2 | 2/2015 | Deighton | |
| 9,199,594 B2 | 12/2015 | Musale et al. | |
| 9,463,759 B1* | 10/2016 | Kiefer | B60R 19/565 |
| 9,566,923 B2 | 2/2017 | Wylezinski | |
| 10,035,483 B2* | 7/2018 | Wylezinski | B60R 19/56 |
| 10,053,037 B2* | 8/2018 | Wylezinski | B60R 19/023 |
| 2001/0030431 A1 | 10/2001 | Killday | |
| 2008/0073921 A1 | 3/2008 | Smidler | |
| 2008/0073941 A1 | 3/2008 | Wylezinski | |
| 2008/0116702 A1 | 5/2008 | Enz et al. | |
| 2009/0001768 A1 | 1/2009 | Saitou | |
| 2009/0102209 A1 | 4/2009 | Ryden et al. | |
| 2015/0258951 A1 | 9/2015 | Wylezinski et al. | |
| 2015/0367798 A1 | 12/2015 | Bobba | |
| 2017/0050595 A1* | 2/2017 | Miller | B60R 19/24 |
| 2017/0050596 A1 | 2/2017 | Miller et al. | |
| 2018/0244227 A1* | 8/2018 | Miller | B60R 19/56 |

FOREIGN PATENT DOCUMENTS

| | | | |
|---|---|---|---|
| CA | 2228428 | 7/1999 | |
| CA | 2275051 | 12/1999 | |
| CA | 2292482 | 6/2001 | |
| CA | 2328034 | 6/2001 | |
| CA | 2466942 | 6/2003 | |
| CA | 2866194 | 9/2013 | |
| MX | 154197 | 6/1987 | |
| MX | 9400055 | 7/1994 | |
| WO | WO 2017/116361 | * 7/2017 | B60R 19/56 |

OTHER PUBLICATIONS

CF16001 Vanguard 30, Feb. 2016 (15 pages).
CF14003 Vanguard 50, Jan. 2015 (14 pages).
Transport Topics, "Wabash to Introduce New Rear Impact Guard," downloaded at http://www.ttnews.com/articles/pasetemplate.aspx.storyid=40928&utm_source=equipment&utm_medium=newsletter&utm_campaign=newsletterFeb. 17, 2016 (1 page).
Insurance Institute for Highway Safety Highway Loss Data Institute, "On Guard Safety Gear on the back of truck Trailers," downloaded at http://www.iihs.org/iihs/sr/statusreport/article/49/7/1 Status Report, vol. 49, No. 7, Oct. 9, 2014 (3 pages).

* cited by examiner

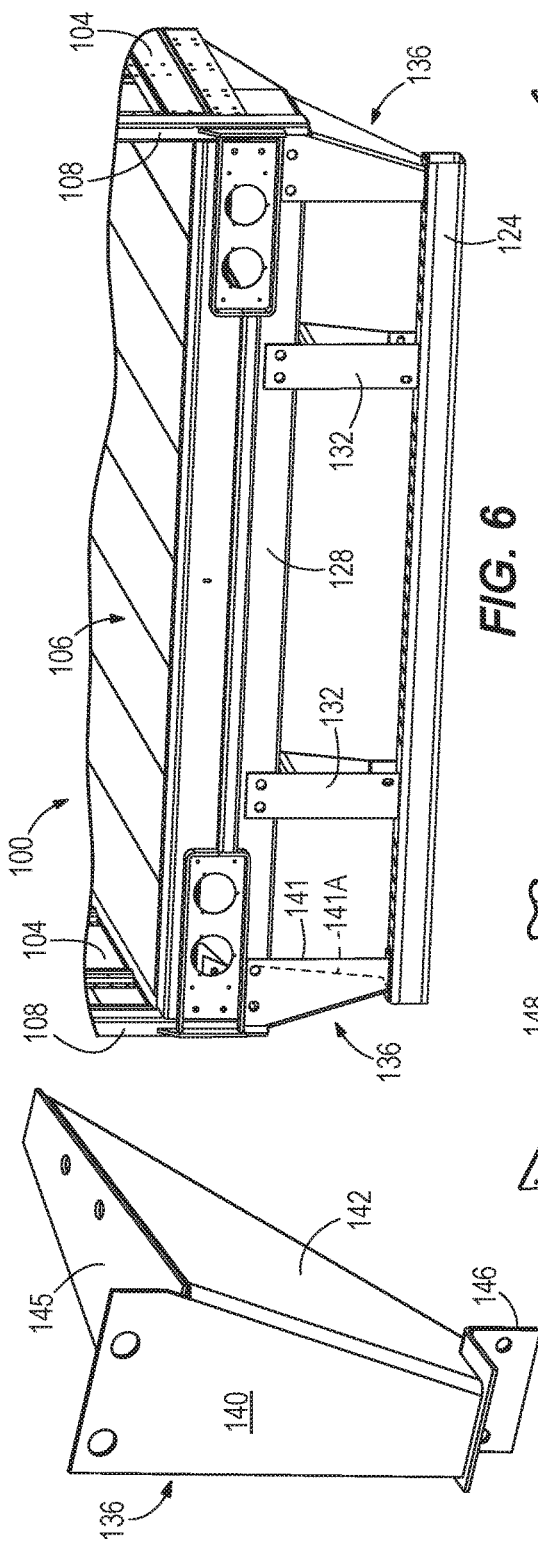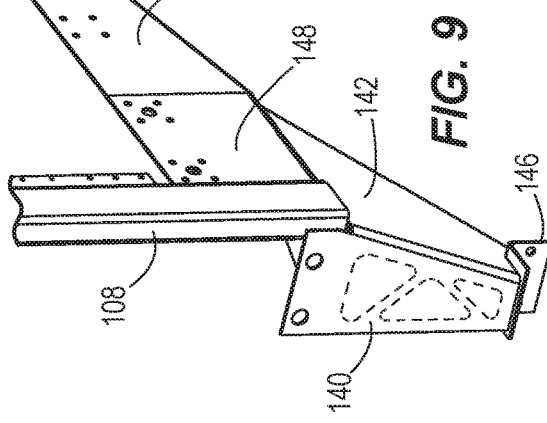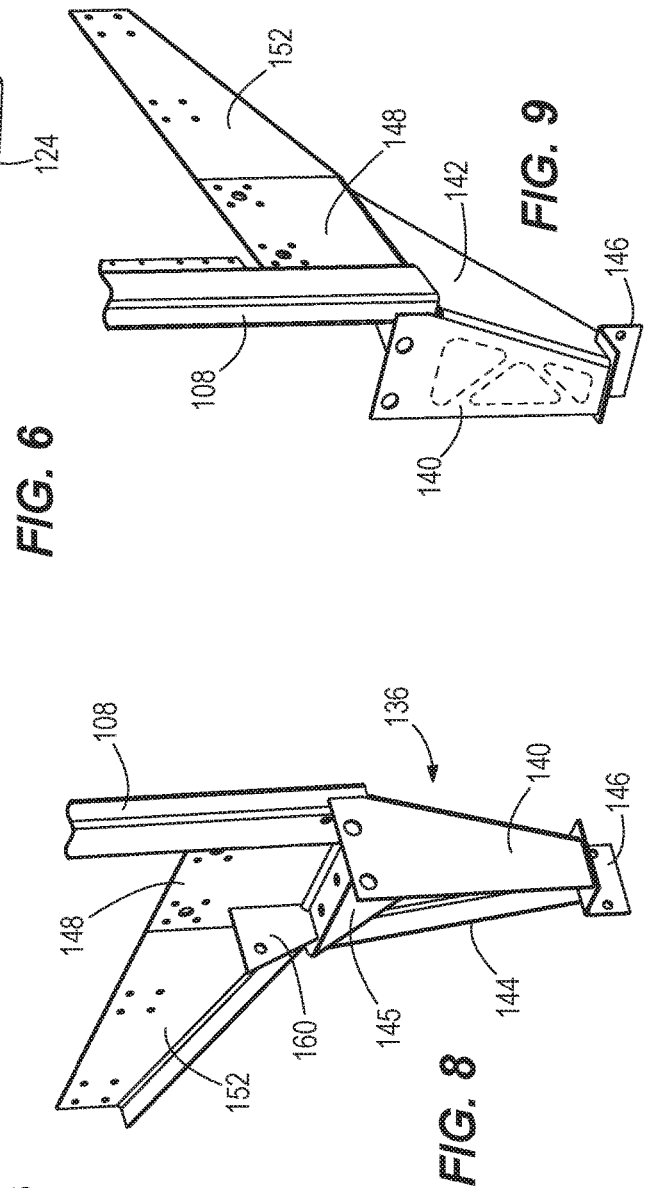

TRAILER WITH REAR IMPACT GUARD

CROSS-REFERENCE TO RELATED APPLICATIONS

This application is a continuation of U.S. patent application Ser. No. 15/240,237, filed Aug. 18, 2016, issued Sep. 26, 2017 as U.S. Pat. No. 9,771,040, which claims priority to U.S. Provisional Patent Application No. 62/206,653, filed Aug. 18, 2015 and to U.S. Provisional Patent Application No. 62/311,695, filed Mar. 22, 2016, and to U.S. Provisional Patent Application No. 62/206,661, filed Aug. 18, 2015 the entire contents of all of which are incorporated by reference herein.

BACKGROUND

The invention relates to over-the-road trailers and rear impact guards thereof. A conventional trailer 1000 is shown in FIG. 1, and is configured for over-the-road use with a truck to transport large cargo volumes. The trailer 1000 has a defined front end 1020 adapted for attachment with the truck, and a defined rear end 1040 opposite the front end 1020. A front-rear, or lengthwise direction X is defined between the front and rear ends 1020, 1040, A transverse or lateral direction Y is defined perpendicular to the lengthwise direction X. The lengthwise and lateral directions Y are both parallel to a ground surface along which the trailer 1000 is conveyable. The rear end 1040 in many cases is provided with doors for accessing the cargo area defined between the front and rear ends 1020, 1040 (and between the sidewalls 1050 and roof 1060, if so equipped). At the rear end 1040 of the trailer, a rear impact guard 1100 is provided. The rear impact guard 1100 complies with federal mandates for many common types of trailers and is designed to reduce the severity of a crash when a vehicle following the trailer 1000 impacts the rear end 1040 of the trailer 1000. The rear impact guard 1100 provides a lowered bumper 1110 below the rear sill or rear bolster 1130 at the bottom rear end of the cargo area. However, it may be desirable to further improve safety, especially for off-center impacts, while minimizing cost and weight penalties to the trailer.

SUMMARY

In one aspect, the invention provides a trailer having a front end provided for attachment to a truck, a rear end spaced in a longitudinal direction from the front end to define a cargo area between the front and rear ends, and a frame. The frame includes a rear bolster, a plurality of cross-members, and a pair of corner gussets extending forwardly from respective distal ends of the rear bolster. The rear bolster extends transversely to the longitudinal direction below a bottom rear edge of the cargo area. A rear impact guard of the trailer includes a bumper positioned at the rear end of the trailer and spaced below the rear bolster, pair of outboard posts, and at least one inboard post. The pair of outboard posts extend between the bumper and the rear bolster adjacent respective opposed distal ends of the bumper, and the at least one inboard post extends between the bumper and the rear bolster at a location laterally between the pair of outboard posts. Each of the pair of outboard posts has a lower end that overlaps with a respective mounting bracket that protrudes upwardly toward the rear bolster from the bumper such that mounting holes of the outboard posts align with mounting holes of the mounting brackets. Each mounting bracket has a laterally-outboard panel that extends obliquely from the bumper in a direction with a laterally-outward component.

In another aspect, the invention provides a trailer having a front end provided for attachment to a truck, a rear end spaced in a longitudinal direction from the front end to define a cargo area between the front and rear ends, and a frame. The frame includes a rear bolster, a plurality of cross-members, and a pair of corner gussets extending forwardly from respective distal ends of the rear bolster. The rear bolster extends transversely to the longitudinal direction below a bottom rear edge of the cargo area. The cross-members extend transversely to the longitudinal direction to define a floor structure. A rear impact guard of the trailer includes a bumper positioned at the rear end of the trailer and spaced below the rear bolster, a pair of outboard posts, and at least one inboard post. The outboard posts extend between the bumper and the rear bolster adjacent respective opposed distal ends of the bumper, and the at least one inboard post extends between the bumper and the rear bolster at a location between the pair of outboard posts. Each of the pair of outboard posts is secured at an upper end thereof to a corresponding one of the pair of corner gussets. The pair of corner gussets are fortified with respective lateral reinforcement members, each of which is secured to an interior side of a corresponding one of the pair of corner gussets and each of which extends laterally-inboard from the corresponding corner gusset.

BRIEF DESCRIPTION OF THE DRAWINGS

FIG. 6 is a perspective view of the rear of the trailer having the rear impact guard of FIG. 2.

FIG. 7 is a rear view of an outer post of the rear impact guard of FIG. 2.

FIGS. 8 and 9 are perspective views of the outer post of FIG. 7 and a mounting assembly securing an upper end of the outer post to the trailer.

DETAILED DESCRIPTION

Figure 1:
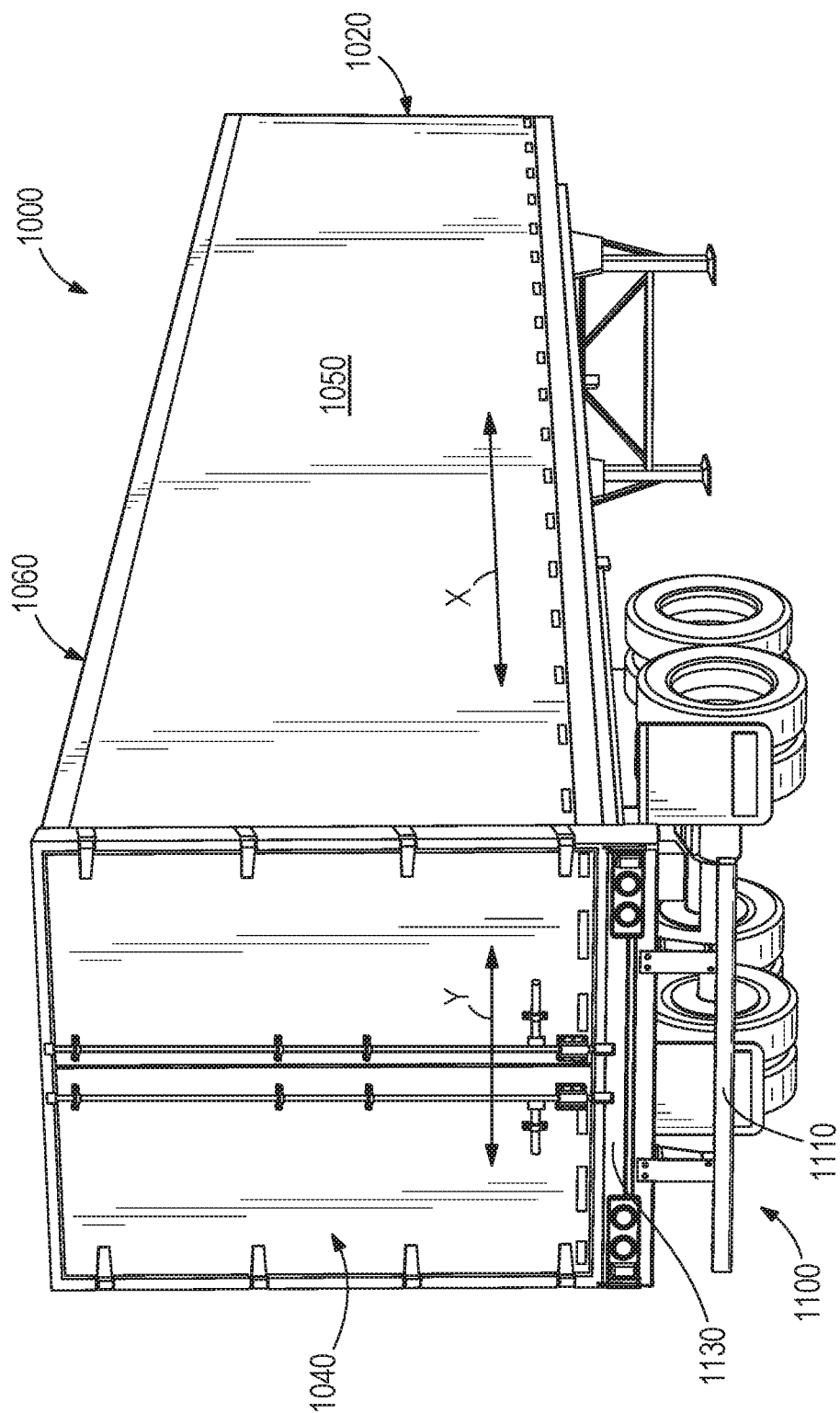
FIG. 1 is a perspective view of a trailer, according to the prior art.
Figure 2:
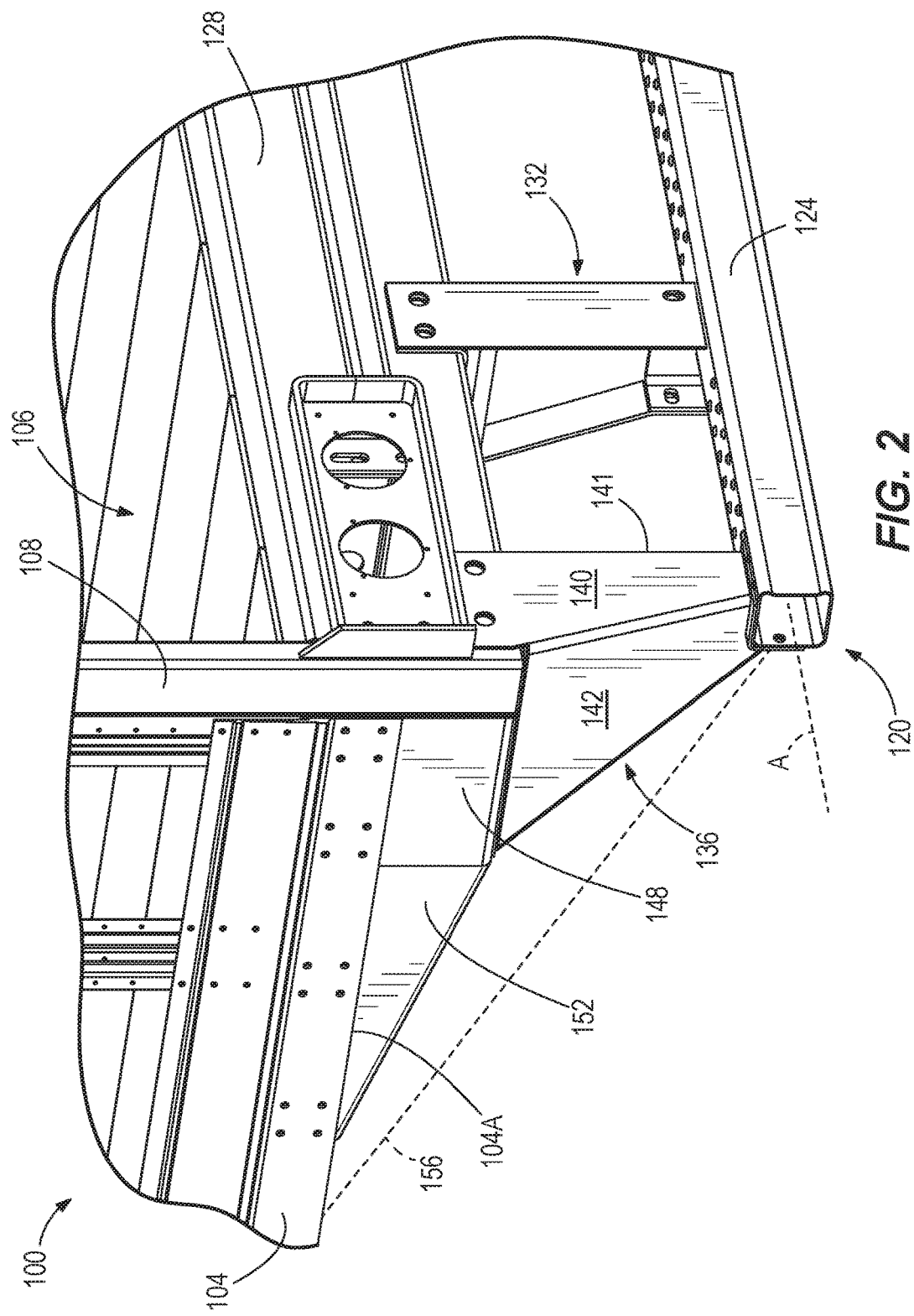
FIG. 2 is a perspective view of a laterally outer portion of a trailer including a rear impact guard according to one embodiment of the invention.

FIGS. 2-9 illustrate a portion of a trailer 100, which in some embodiments can be a trailer configured for over-the-road use with a road tractor (e.g., in forming a so-called 18-wheeler) to transport large amounts of cargo. Aspects of the invention may not be limited to such types of trailers however, and it will be understood that features described herein may also apply to many other types of trailers, including those typically having rear impact guards, and others that may not. Similar to that of FIG. 1, the trailer 100 can include a chassis having axles with multiple sets of wheels. The trailer 100 defines a length in a longitudinal or transport direction between its front and rear ends. The length of the trailer 100 can be 53 feet in some constructions, although the trailer 100 can be manufactured to other lengths greater than or less than 53 feet. Perpendicular to the longitudinal direction, the trailer 100 defines a width and a height. The width cooperates with the length to define a plan view footprint of the trailer 100, while the height is measured perpendicular to the footprint (which can be perpendicular to the ground). Subtracting for wall thicknesses, the length, the width, and the height cooperate to define a cargo-receiving interior volume of the trailer 100. The illustrated trailer 100 includes sidewalls, a roof, and a floor, although in other embodiments the trailer only has a floor, or only has a floor and less than four complete sidewalls. While not shown in entirety, the illustrated trailer 100 is an enclosed trailer, but the trailer may be a non-enclosed trailer in other constructions. In any construction, the trailer 100 defines a cargo area operable to receive a load of cargo for transport. Longitudinal top rails and longitudinal bottom rails 104 extend along the length of the trailer 100 at the lateral side edges at the tops and bottoms of the lateral sidewalls, respectively. At a rear of the trailer 100 as shown in FIG. 2, an opening is provided to selectively access the cargo area for loading and unloading cargo. One or more doors may be provided to selectively close the opening. The trailer 100 also has a load floor 106 for receiving and supporting cargo for transport.

At the rear end of the trailer 100, two vertically-extending rear frame posts 108 are provided. The rear frame posts 108 define the lateral sides of the opening into the cargo area of the trailer 100. Along with the longitudinal upper rails, the longitudinal bottom rails 104 terminate at and are secured to the corresponding rear frame posts 108. The rear frame posts 108 can have a hollow box structure, or other suitable construction. A rear sill or bolster 128 of the trailer frame extends along a bottom rear edge of the cargo area and has two opposing lateral distal ends secured to (e.g., welded to) the two rear frame posts 108. Below the load floor 106, a plurality of spaced-apart cross-members 112 or floor joists are provided. The cross-members 112 can be spaced at intervals throughout the entire length of the trailer 100, each cross-member 112 extending along a respective horizontal axis that is transverse to the longitudinal direction of the trailer 100. A pair of longitudinally-extending slider rails 116 (one shown in FIG. 4) extend underneath the cross-members 112 in the rear section of the trailer 100. The suspension supporting the wheels of the trailer 100 is coupled to the slider rails 116, allowing a certain amount of movement of the suspension relative to the slider rails 116. The bottom rails 104, the rear frame posts 108, the cross-members 112, and the slider rails 116, along with additional components described below form a frame of the trailer 100.

A rear impact guard 120 is provided at the rear end of the trailer 100 and is secured to the trailer frame. The rear impact guard 120 includes a plurality of elements structurally coupled to the trailer frame generally below the rear opening of the trailer 100. The rear impact guard 120 can include a bumper 124 extending along a horizontal axis A transversely across the rear of the trailer 100 at a height spaced below the cargo area. The bumper 124 can extend parallel and directly below the rear bolster 128. The bumper 124 may take any number of constructions, and may be a hollow bumper tube having a circular, rectangular, or square cross-section, among others. The illustrated bumper 124 is of tubular form, and has a modified square cross-section (when viewed along a transverse direction of the trailer 100, perpendicular to a front-rear direction of the trailer 100,) with four equal-length sides. The cross-section of the bumper 124 can be consistent throughout its length along an axis A. In the illustrated embodiment, the bumper 124 forms the lowest point of the rear impact guard 120 and extends across the entire width of the trailer 100, or at least within 100 mm of the lateral extremities of the trailer 100, although other bumper dimensions are possible. Multiple posts support the bumper 124 relative to the trailer 100, including at least one inboard posts 132 (e.g., a pair as shown) and a pair of outboard posts 136. In some embodiments, including the illustrated embodiment, the inboard posts 132 are positioned within the central 70 percent of the width of the bumper 124, while the outboard posts 136 are positioned at the distal ends of the bumper 124 (e.g., connecting to the bumper 124 outside of the central 90 percent or the central 95 percent of the bumper 124).

Each of the outboard posts 136 has a similar construction, although each is a mirror image of the other. Details of the outboard posts 136 are described with respect to one of the outboard posts 136, while it will be understood that these features also apply to the other. The outboard post 136 can be provided with multiple attachment surfaces at its lower end (for attachment to the bumper 124) and multiple attachment surfaces at its upper end (for attachment to the rear bolster 128, among other portions of the trailer 100). Between the upper and lower ends of the outboard post 136, multiple panels are provided, including at least a rear panel 140 and a laterally outboard panel 142. The rear panel 140 has an outer surface facing the rear of the trailer 100, and the laterally outboard panel 142 has an outer surface facing laterally outward. In some embodiments, such as the illustrated embodiment, the post 136 further includes a forward panel 144 spaced forwardly of the rear panel 140. Although not required among all possible constructions, the three panels 140, 142, 144 can be integrally formed from a single sheet of material (e.g., bent with two bends) to distinguish the three non-planar panels 140, 142, 144. Any one or more of the panels 140, 142, 144 can include one or more apertures, openings, or cutouts for strategic weight relief to minimize the overall weight of the post 136 and the rear impact guard 120. Dashed lines are used in FIG. 9 to show weight-reducing apertures, according to one exemplary layout, that can be provided in the panel 140. FIGS. 20-22 and 25, discussed further below, also provide other examples of weight-reducing apertures.

Figure 4:
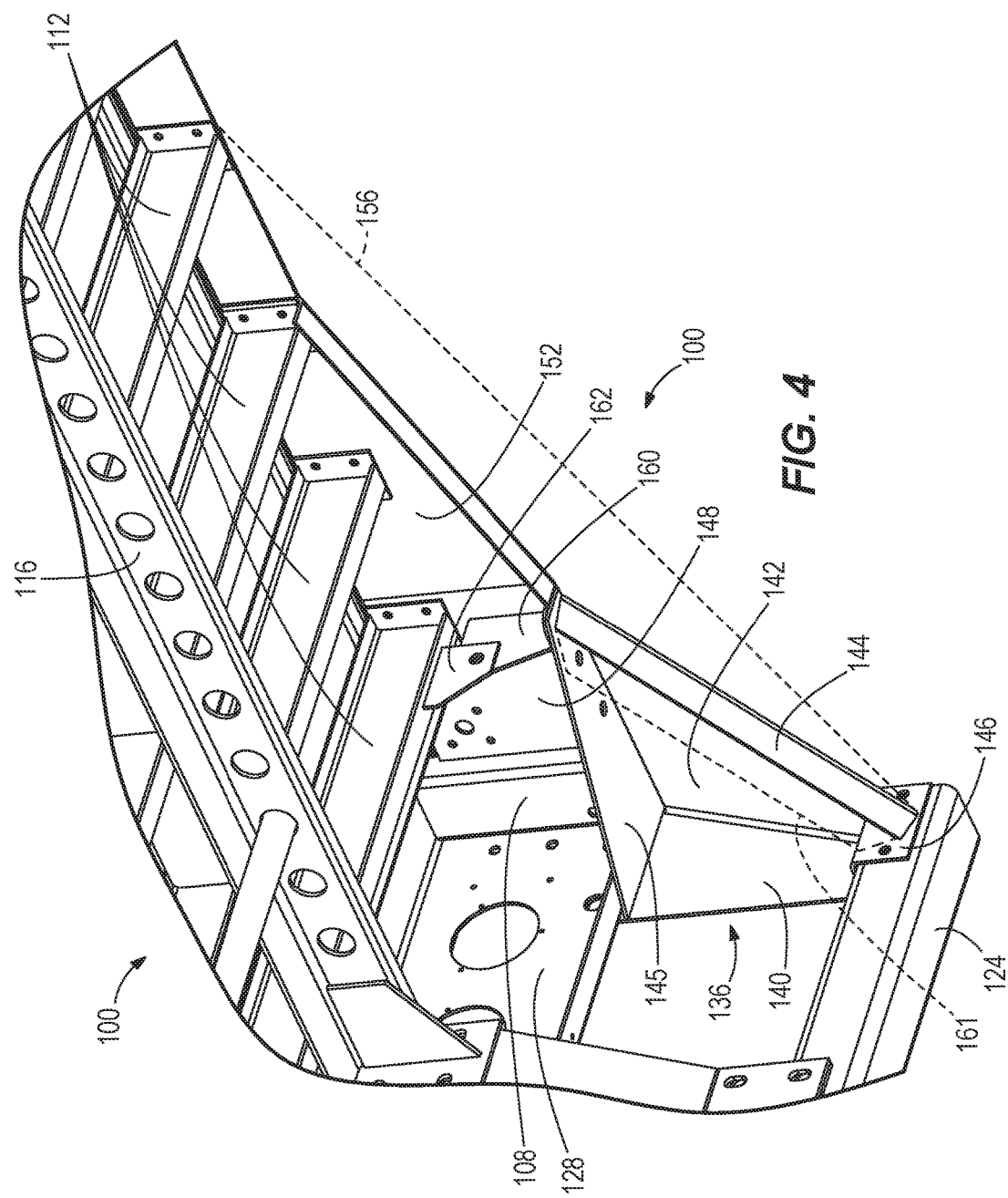
FIG. 4 is a perspective view of the laterally outer portion of the trailer with rear impact guard of FIG. 2, viewed from underneath the trailer.
Figure 10:
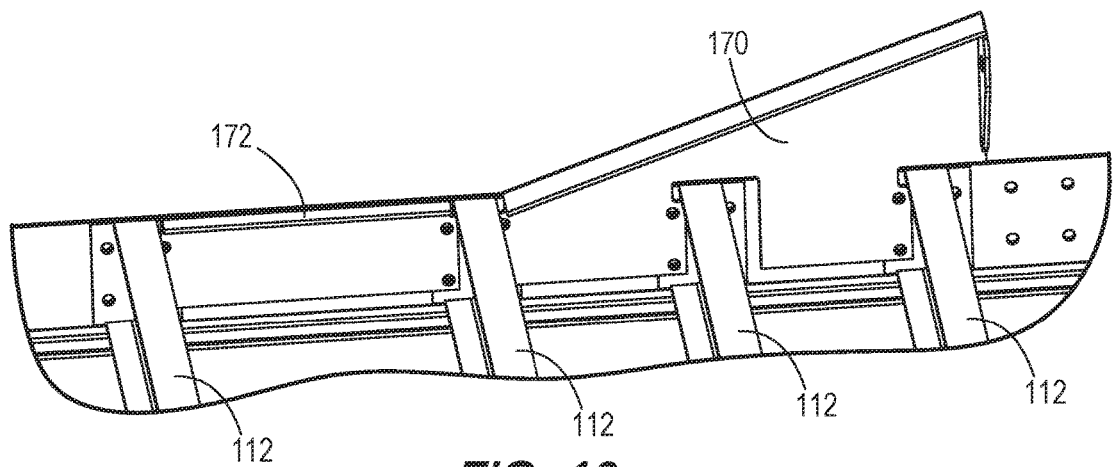
FIG. 10 is a perspective view of a bolt-on rail reinforcement assembly assembled to a trailer frame.
Figure 11:
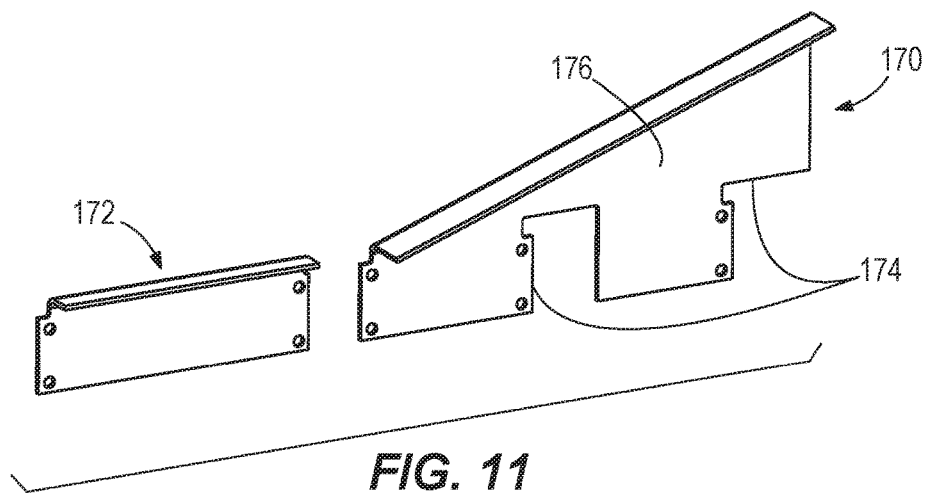
FIG. 11 is a perspective view of bolt-on rail reinforcement elements of FIG. 10 as removed from the trailer frame.
Figure 12:
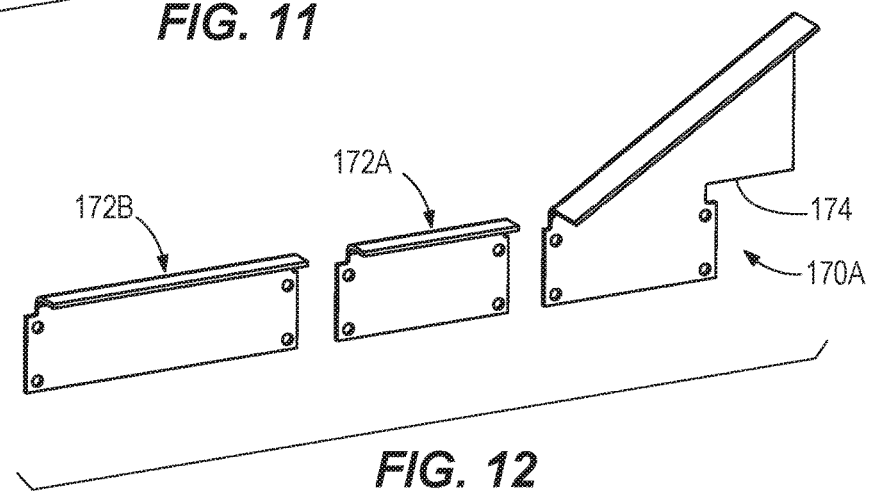
FIG. 12 is a perspective view of a bolt-on rail reinforcement assembly according to another embodiment.

As shown in FIG. 4, the outboard post 136 can further include a gusset 145 positioned at the upper portion and secured (e.g., via welding, folding of material common to any or all of the panels 140, 142, 144, and the like) with the panels 140, 142, 144 to further strengthen the post and provide a mounting location as discussed below. At a lower end, the outboard post 136 is provided with a mounting bracket 146 for attachment to the bumper 124. The mounting bracket 146 can be secured (e.g., via welding, folding of material common to any or all of the panels 140, 142, 144, and the like) to one, two or all of the panels 140, 142, 144. In some embodiments, the mounting bracket 146 has a non-flat shape that conforms to a portion of an outer surface of the bumper 124. The mounting bracket 146 can be a plate of uniform thickness (e.g., formed by bending a flat plate), such that the bottom ends of the panels 140, 142, 144 also generally conform to the non-flat shape of the outer surface of the bumper 124 as shown in FIGS. 10-12. In this manner, the mounting bracket 146 can extend to and be secured to multiple sides (e.g., top and forwardly-facing side, as shown in FIG. 4 by way of example) of the bumper 124. In other embodiments, the mounting bracket 146 is secured to only a single side of the bumper 124, such as only to a top side of the bumper 124 or to a forwardly-facing side of the bumper 124. Also, in some alternative embodiments, the mounting bracket 146 is defined in whole or in part by the bottom ends of the panels 140, 142, 144, which can be shaped as described above to contact and be secured to one or more sides of the bumper 124 as also described above.

As shown in FIG. 2, the rear frame post 108 extends lower than the bottom rail 104. A corner gusset 148 of the trailer frame is secured to the rear frame post 108, and the bottom rail 104 and/or at least one of the cross-members 112 to occupy the space forward of the bottom end of the rear frame post 108 and below the rear end of the bottom rail 104. As described below, the corner gusset 148 provides a mounting location for attachment of the outboard post 136 to mount the rear impact guard 120 to the trailer 100.

Figure 3:
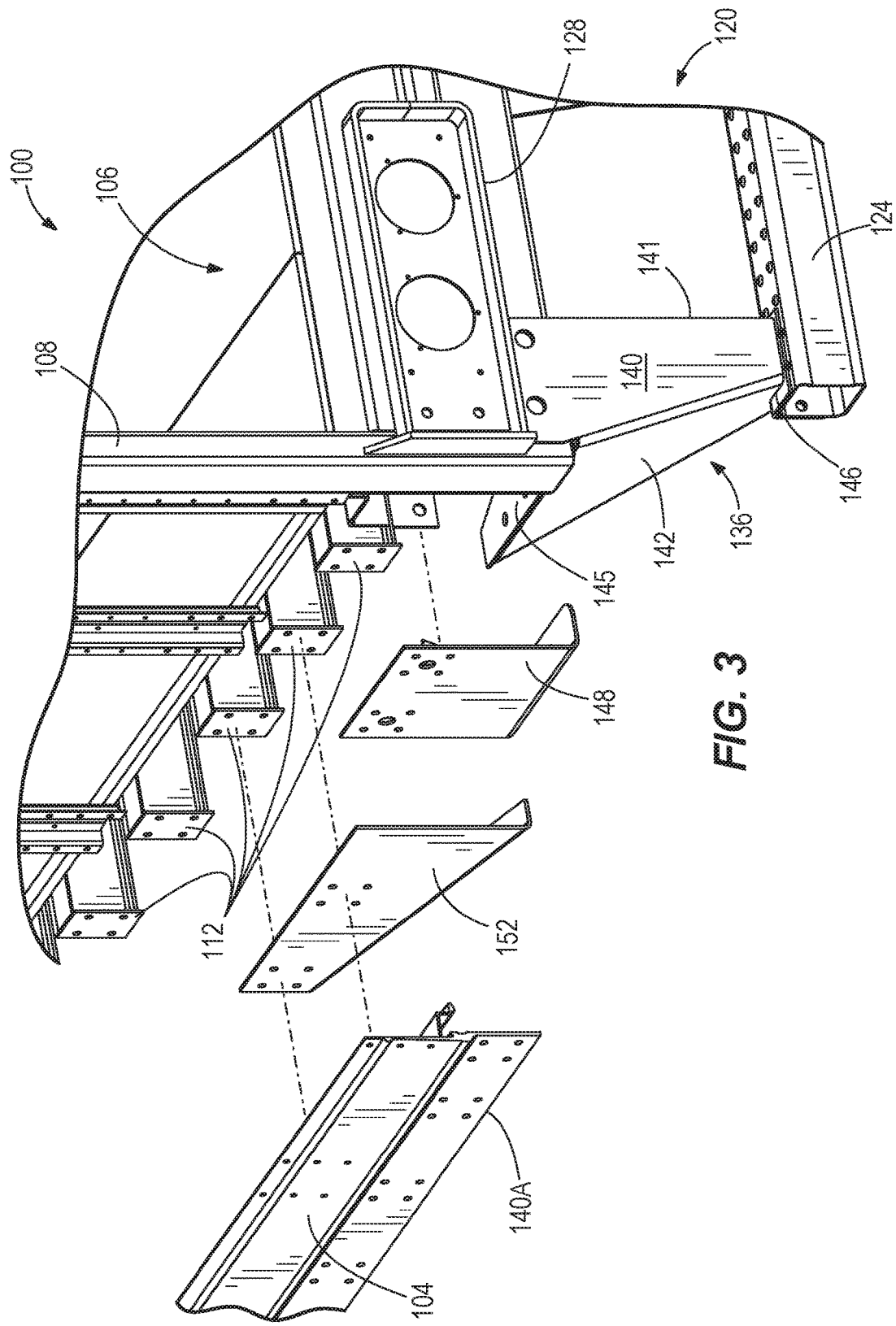
FIG. 3 is an exploded assembly view of the laterally outer portion of the trailer with rear impact guard of FIG. 2.
Figure 5:
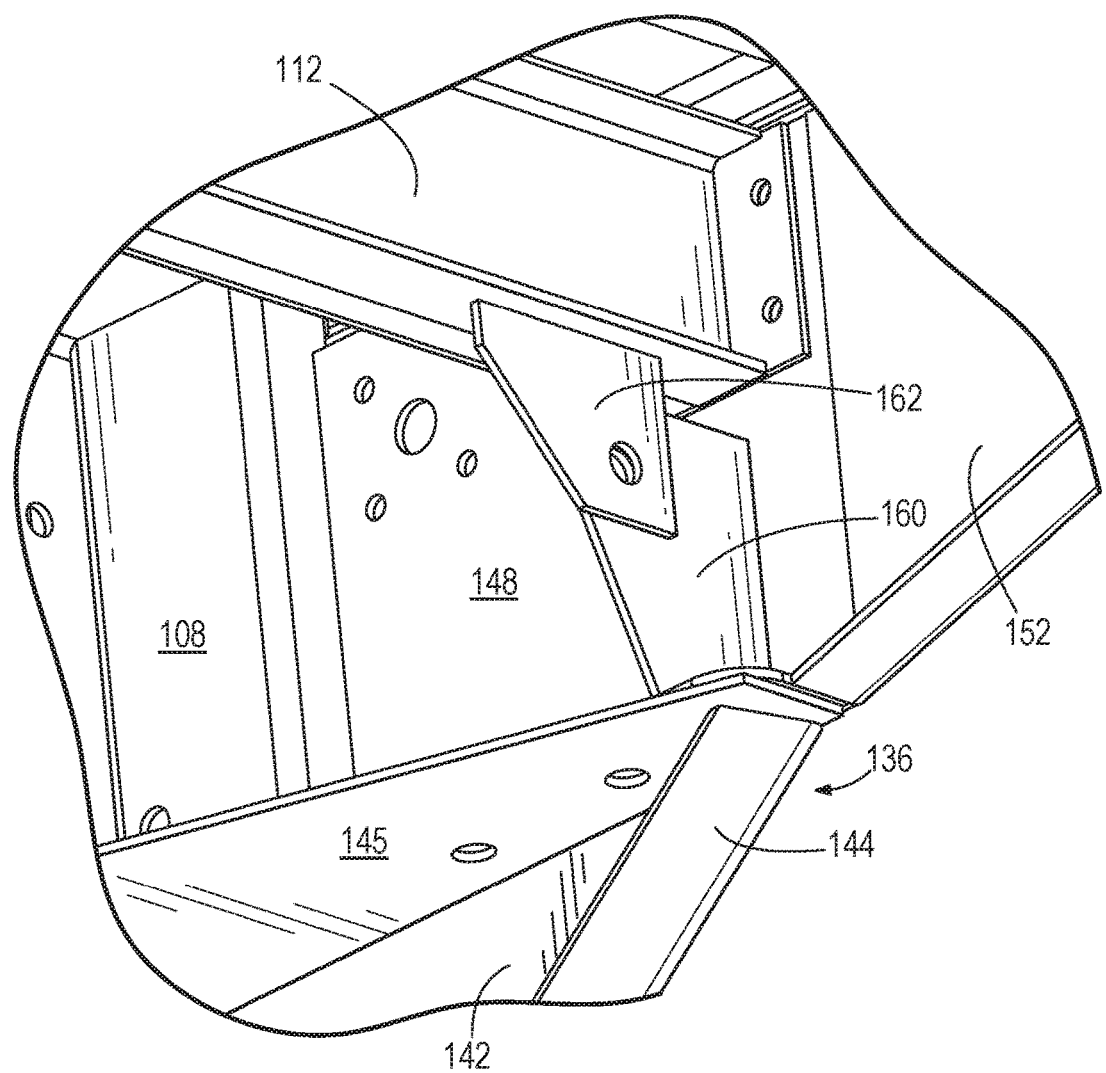
FIG. 5 is a perspective view of a supplementary lateral support attachment between the rear impact guard of FIG. 2 and a trailer cross-member.

In some embodiments, such as in the illustrated embodiment, a reinforcement member 152 extends directly forward from the corner gusset 148 along bottom half of the bottom rail 104, and extending below a bottom edge 104A of the bottom rail 104. The illustrated reinforcement member 152 has a triangular side profile that tapers in height toward the forward end, although other shapes are possible while still being attached to the other portions of the trailer frame described below. With reference again to the illustrated embodiment, in some embodiments the height at the rear end of the reinforcement member 152 matches that of the corner gusset 148. However, the reinforcement member 152, or an additional aerodynamic panel, may be provided in the profile indicated by the dashed lines 156 in FIGS. 2 and 4. Each of the corner gusset 148 and the reinforcement member 152 can have an L-shaped cross-section as seen in FIGS. 3 and 8, among others. As shown in FIGS. 4-5, a gusset 160 perpendicular to both portions of the L-shaped corner gusset 148 is fixed (e.g., welded) to the corner gusset 148 to provide additional rigidity, particularly in the lateral direction. Likewise, a gusset 162 can be fixed (e.g., welded) to the cross-member 112 adjacent the corner gusset 148, and/or can be secured to the gusset 160 of the corner gusset 148 via a removable fastener, such as one or more bolts. However, lateral stiffness may be supplemented in alternate ways with one or more gussets at this location or others, coupled with removable fasteners or in a permanent manner such as welding. In another example, the corner gusset can be provided with a U-shaped cross-section so that a vertically-extending inboard panel is parallel to and spaced from the vertically-extending outboard panel, with a bottom panel connected therebetween. One or more internal gussets can be provided between the panels that form the "U" shape of such a corner gusset. The outboard panel can extend to a height greater than that of the inboard panel for connection to the end or ends of at least one cross-member 112 and the bottom rail 104 of the trailer 100, while the inboard panel extends up into contact with a bottom surface of one or more of the cross-members 112.

The outboard post 136 has an upper portion that wraps around the lower rear corner of the trailer frame to connect to the trailer frame directly inboard of the rear frame post 108 and directly forward of the rear frame post 108. With continued reference to the illustrated embodiment, a first upper edge of the outboard post 136 extends along and is secured to a rear-facing surface of the rear bolster 128, and a second upper edge portion of the outboard post 136 extends longitudinally along and is secured to the corner gusset 148 along a laterally outer edge of the trailer frame. This arrangement can utilize two separate mounting locations, each configured for attachment to the trailer frame with at least one removable fastener (e.g., bolts), although permanent manner of fastening (e.g., welding) are possible. In the illustrated embodiment, the first mounting location at the upper portion of the first panel 140 includes two laterally-spaced bolt holes. The second mounting location, at the gusset 145, includes two longitudinally-spaced bolt holes. As shown in FIGS. 8 and 9, the outboard post 136, in the area of the first mounting location, can form a flange that overlaps and abuts a rear-facing surface of one or both of the rear frame post 108 and the rear bolster 128. The outboard post 136, in the area of the second mounting location formed by the gusset 145 at the upper end, can abut a bottom end of the rear frame post 108. The outboard post 136 can be releasably (e.g., bolts) or permanently (e.g., welding) attached to the rear frame post 108 at either or both of these locations. Additionally, the upper horizontally-lying surface of the gusset 145 may abut corresponding bottom ends of any or all of the rear bolster 128, the rear frame post 108, and the corner gusset 148. The outboard post 136 can be releasably (e.g., bolts) or permanently (e.g., welding) attached to the rear bolster 128, the rear frame post 108, and/or the corner gusset 148 at any or all of these locations.

As mentioned above, the illustrated outboard post 136 has a lower portion that at least partially wraps around the bumper 124. For example, the mounting bracket 146 at the lower end of the illustrated outboard post 136 extends along a top surface of the bumper 124 and extends along a forward-facing surface of the bumper 124. Multiple mounting locations are provided by the mounting bracket 146 (e.g., holes for receiving removable fasteners such as bolts). For example, a first mounting hole is provided in the portion of the mounting bracket 146 engaging the top of the bumper 124 and a pair of mounting holes are provided in the portion of the mounting bracket 146 engaging the forward-facing surface of the bumper 124.

As described, the design of the outboard posts 136 allows the outboard post 136 to be provided to the trailer frame in a bolt-on manner, and further allows the bumper 124 to be provided to the outboard posts 136 in a bolt-on manner. As shown in the accompanying drawing views, the inboard post(s) 132 can also be provided as bolt-on components between the trailer frame and the bumper 124. However, in an alternate embodiment, some or all of the connections between the posts 132, 136 and the trailer frame and/or between the posts 132, 136 and the bumper 124 may be of a permanent, non-removable type such as welding ("non-removable" referring to the inability to remove without damage or destruction). For example, the lower ends of the outboard posts 136 (and optionally, the inboard posts 132) can be welded directly to the bumper 124. In such embodiments, the mounting bracket 146 may be omitted, and the panels 140, 142, 144 may be welded directly to the bumper 124. The general shape of the lower end of the outboard post 136 can be the same as described above to wrap around the bumper 124. If the lower end of the outboard post 136 is welded, but the upper end of the outboard post 136 (and each inboard post 132) retains a bolt-on arrangement, the rear impact guard 120 as a whole can be provided in a bolt-on manner to the trailer frame. By limiting the amount of components of the rear impact guard 120 that are made integral with the trailer frame, the rear impact guard 120 and/or components thereof may be serviceable in the field with minimal time and cost, and minimal risk of damaging the trailer. For example, in the event of cosmetic or minimal damage to an outboard post 136 or to the bumper 124, the individual component (or the rear impact guard 120 as a whole) may be removed by simply removing bolted connections, and can then be replaced. Although bolts and nuts may be utilized throughout the rear impact guard 120 as shown and described, it will be understood that other types of threaded fasteners may instead be utilized, as can any other type of removable fastener. In this regard, as used herein and in the appended claims the term "bolt-on" shall not be interpreted as limiting specifically to the use of bolts.

As shown in at least FIGS. 2 and 3, the outer post 136 has an inboard edge 141, formed by the rear panel 140, and the inboard edge 141 extends vertically. In particular, the inboard edge 141 has no lateral taper as viewed from the rear, and is extended in a vertical direction perpendicular to the bumper 124. However, as indicated at the left side of FIG. 6, the outboard post 136 can include a tapered inboard edge 141A that extends gradually more laterally outward along a downward extent toward the bumper 124. As such, the tapered inboard edge 141A can form an obtuse angle with the rear bolster 128 in rear view, while an acute angle is formed in rear view between the inboard edge 141A and the bumper 124. This design can be incorporated on both outboard posts 136, despite only being illustrated on the left side in FIG. 6. Further, the tapered inboard edge 141A. can be combined with other aspects and embodiments of the invention disclosed herein.

Further features, usable together or alone in combination with a rear impact guard as described above, are illustrated in FIGS. 10 to 25 and discussed below.

FIGS. 10 and 11 illustrate a bolt-on rail reinforcement assembly including a primary reinforcement member 170 and a secondary reinforcement member 172 that is longitudinally spaced from and aligned with the primary reinforcement member 170. The primary reinforcement member 170 generally replaces the reinforcement member 152 as shown in FIGS. 1-5. However, whereas the ends of the cross-members 112 abut with the reinforcement member 152 of FIGS. 1-5, the primary reinforcement member 170 of FIGS. 10 and 11 features recesses 174 that receive the ends of the cross-members 112 so that the primary reinforcement member 170 form-fits around one or more of the cross-members 112. As such, a pre-standardized cross-member length (in the lateral trailer direction) can be used throughout the trailer, avoiding customized, shorter-length cross-members at the rear end of the trailer that is reinforced for the rear impact guard. The design of the reinforcement members 170, 172. also allows installation at any given point in the assembly process, and does not require installation at the time of connection between the bottom rail 104 and the cross-members 112, since the reinforcement members 170, 172 are not sandwiched between the bottom rail 104 and the ends of the cross-members 112. A triangular gusset portion 176 of the primary reinforcement member 170 is provided to extend below the bottom rail 104, similar to the reinforcement member 152 of FIGS. 1-5. The primary reinforcement member 170 can be provided with mounting holes to be secured with fasteners to the bottom rail 104 along with the cross-members 112. The optional secondary reinforcement member 172 is positioned forward of the primary reinforcement member 170, and is provided with a size and shape that fits between two adjacent cross-members 112. The secondary reinforcement member 172 can be entirely nested between the cross-members 112, with no gusset portion extending below the cross-members 112 or the bottom rail 104. The secondary reinforcement member 172 provides a reinforced connection between the two adjacent cross-members 112, alongside the bottom rail 104. FIG. 12 illustrates an alternate bolt-on rail reinforcement assembly in which a primary reinforcement member 170A is provided with a single recess 174, rather than two recesses 174, and the primary reinforcement member 170A has a shorter length that that of FIGS. 10-11. One or more secondary reinforcement members 172A, 172B can be provided forward of the primary reinforcement member 170A so that the total reinforced length can match that of FIGS. 10-11, even with a shorter primary reinforcement member 170A. The secondary reinforcement members 172A, 172B can be of uneven lengths to accommodate the existing cross-member spacing.

Figure 19:
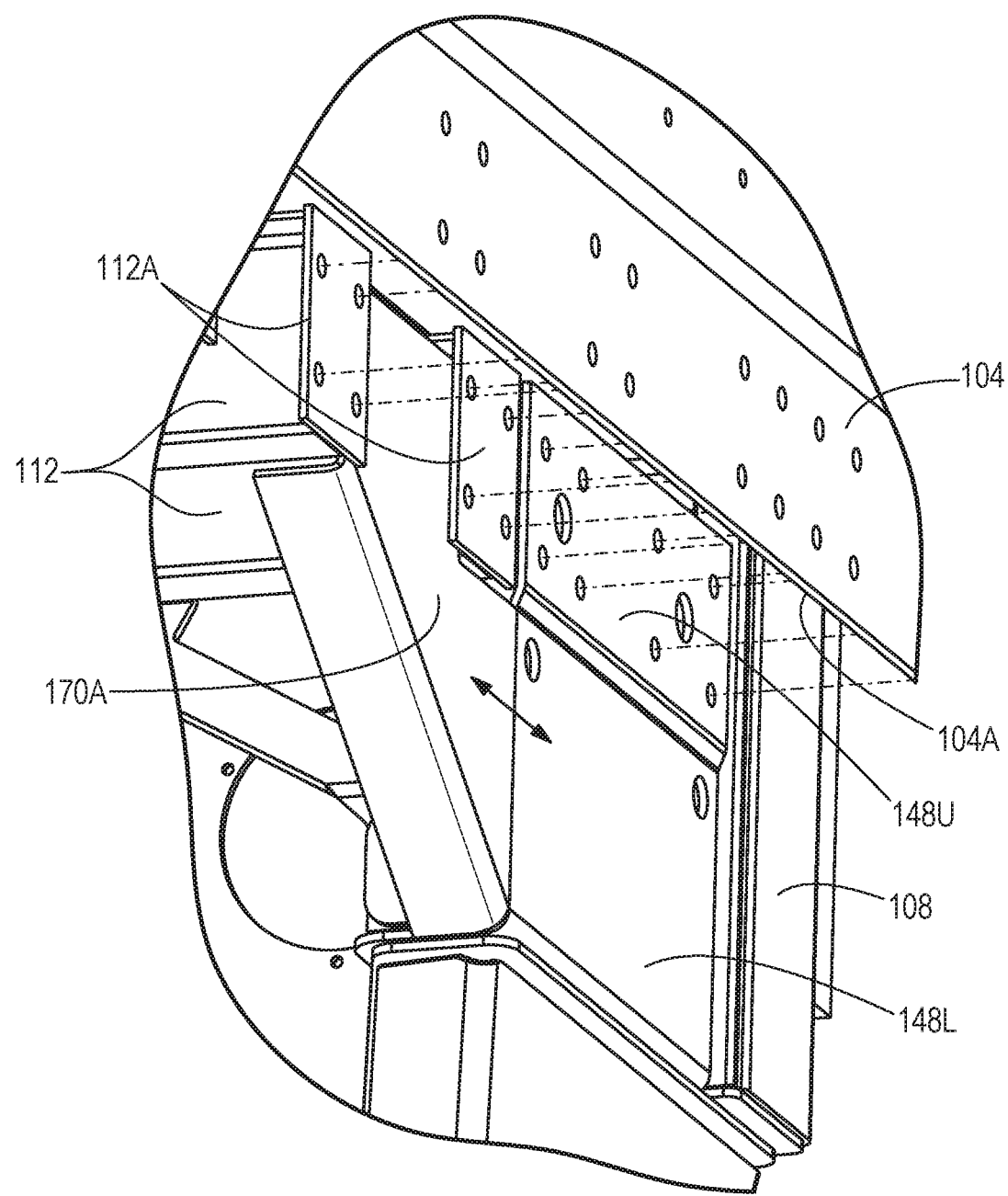
FIG. 19 is a perspective view illustrating a corner gusset having laterally-offset upper and lower portions so that the vertically-oriented outward-facing surface forms a flush interface with the adjacent rail reinforcement element.
Figure 20:
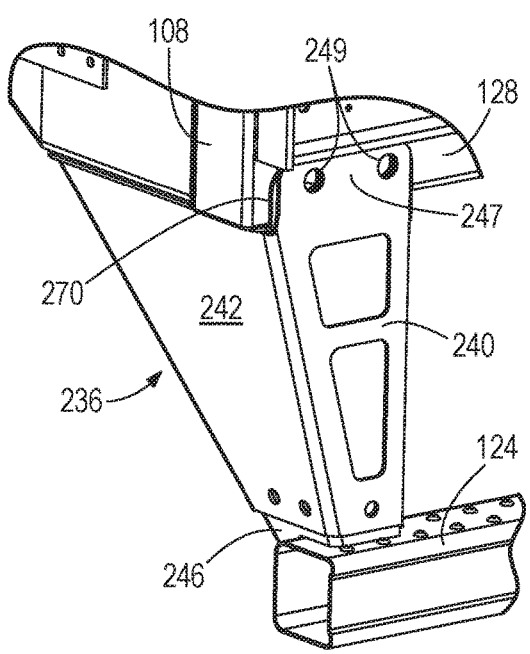
FIG. 20 is a perspective view of a portion of a rear impact guard according to another embodiment in which each outboard post is bolted to a mounting bracket protruding up from the distal end of the bumper.
Figure 21:
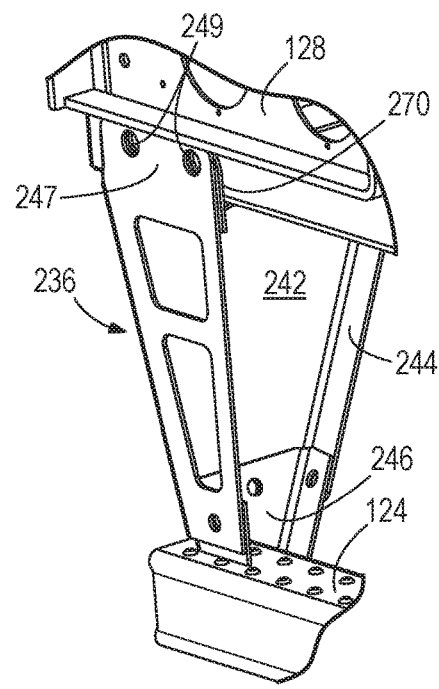
FIG. 21 is an alternate perspective view of the rear impact guard of FIG. 20.
Figure 22:
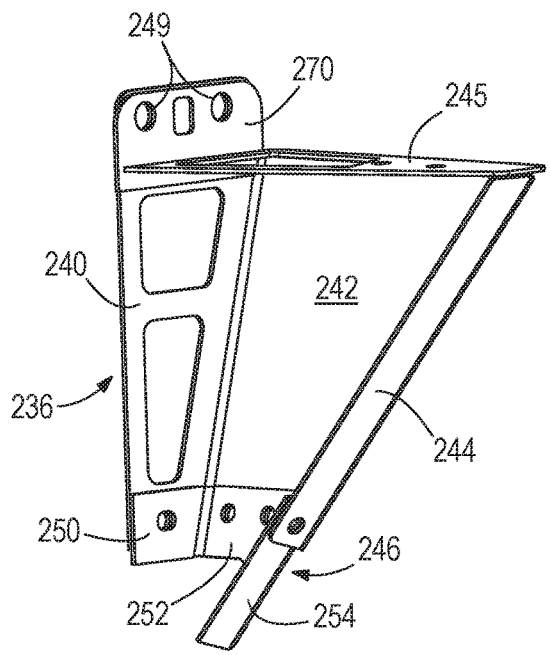
FIG. 22 is an alternate perspective view of only the outboard post and the mounting bracket of the rear impact guard of FIG. 20

FIG. 19 illustrates the primary reinforcement member 170A of FIG. 12 from the exterior side of the trailer, showing how the primary reinforcement member 170A extends between adjacent cross-members 112, without extending between the end of any cross-member 112 and the bottom rail 104, which is shown laterally-exploded in FIG. 19. Because the primary reinforcement members 170, 170A of FIGS. 10-12 do not extend laterally past the ends of the cross-members 112, but a portion of the corner gusset 148 does extend laterally past the ends of the cross-members 112, a potential misalignment may occur between the laterally outboard surfaces of the corner gusset 148 and the primary reinforcement member 170, 170A that are exposed below the bottom edge 104A of the bottom rail 104. To prevent such a misalignment, the corner gusset 148 can be constructed so that a lower portion 148L that extends below the bottom rail 104 is offset laterally-inward from an upper portion 148U that is sandwiched between the cross-member ends and the bottom rail 104. The upper and lower portions 148U, 148L can be parallel with each other and offset by an amount equal to a material thickness of the end plates 112A of the cross-members 112 so that the exposed outer surface of the lower portion 148L has a smooth transition to and is flush with the directly-adjacent primary reinforcement member 170, 170A as indicated by the double arrow in FIG. 19.

Figure 13:
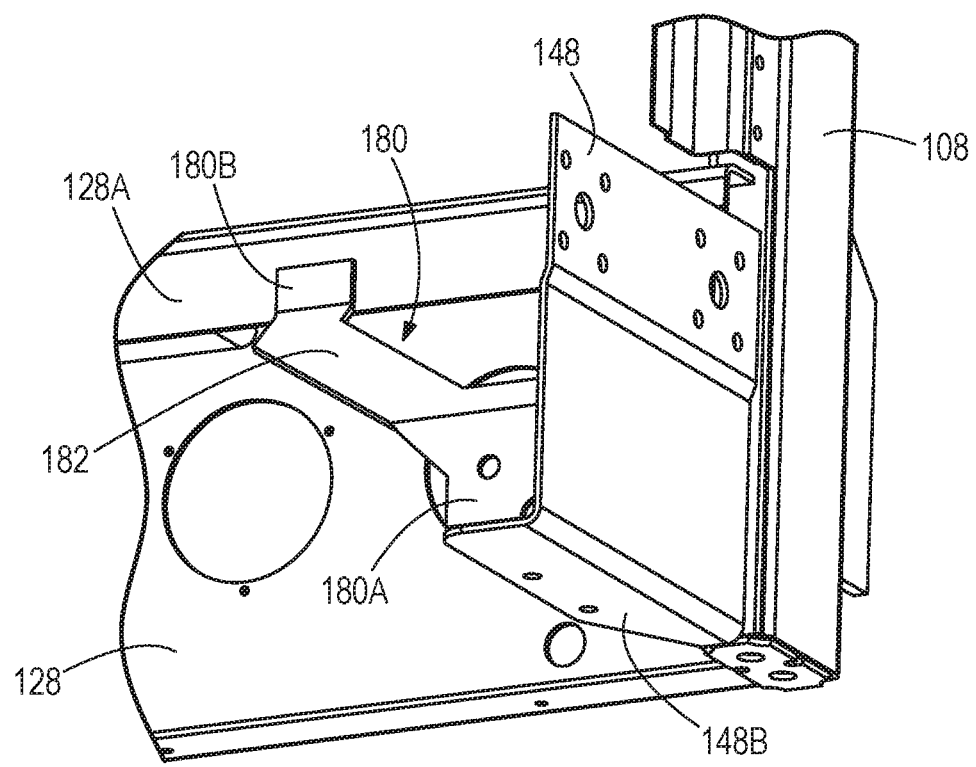
FIGS. 13 and 14 are perspective views of a truss-type lateral support member that extends between the corner gusset and the rear sill.
Figure 14:
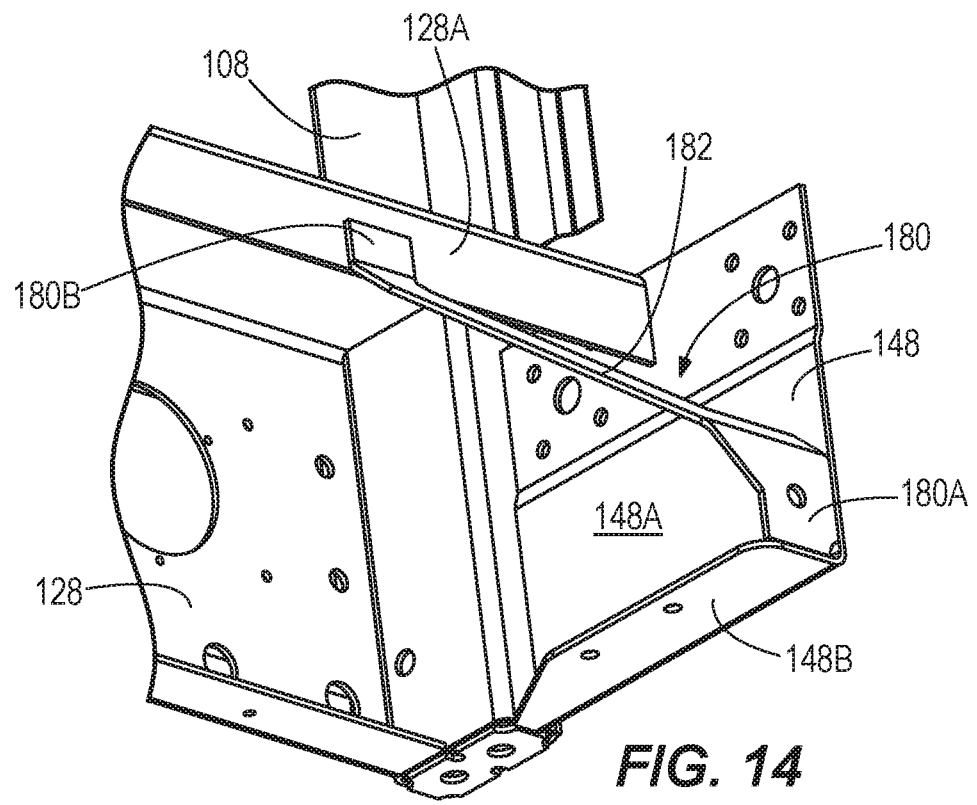

FIGS. 13 and 14 illustrate a lateral reinforcement member 180 that provides supplemental lateral structural support for the corner gusset 148 in the event of an impact to the rear impact guard of the trailer by extending in a laterally-inboard direction from an interior side of the corner gusset 148 to which it is secured. Although only one corner gusset 148 on one side of the trailer is shown in the drawings, it will be understood that lateral reinforcement members 180 are provided along both of the corner gussets 148, at opposite ends of the rear bolster 128. A first or laterally-outboard end 180A of the lateral reinforcement member 180 is secured to the corner gusset 148. A mounting hole in the first end 180A can also be provided for alignment with a mounting hole in a tab or gusset (not shown) extending laterally-inwardly from one of the primary reinforcement members 170, 170A so that the lateral reinforcement member 180 can be fastened (e.g., bolted) to the primary reinforcement member. As shown, the first end 180A can have edges that extend along both the vertically-extending inward-facing surface 148I. and a horizontally-extending surface of a transverse flange 148B of the corner gusset 148 (e.g., that forms a short leg of the "L" shaped corner gusset 148). The first end 180A of the lateral reinforcement member 180 can be welded to the corner gusset 148 along its edges. The lateral reinforcement member 180 has a leg 182 extending laterally inward from the first end 180A to a second or laterally-inboard end 180B of the lateral reinforcement member 180 secured at an inwardly-spaced connection point to the rear bolster 128. For example, the second end 180B of the lateral reinforcement member 180 can be secured (e.g., bolted or welded) to an upper return flange 128A of the rear bolster 128. The lateral reinforcement member 180 can be constructed of sheet metal that is cut into shape and bent into the form shown. The above-mentioned edges are formed by a sheet thickness of the material forming the lateral reinforcement member 180. The lateral reinforcement member 180 provides a truss effect that reinforces the corner gusset 148 to inhibit the corner gusset 148 from rolling or folding over during a rear impact. The lateral reinforcement member 180 allows reinforcement of the corner gusset 148 without any direct connection to any of the cross-members 112 in the trailer floor. Thus, the rear frame structure and the floor can be manufactured and assembled as separate sub-assemblies.

Figure 15:
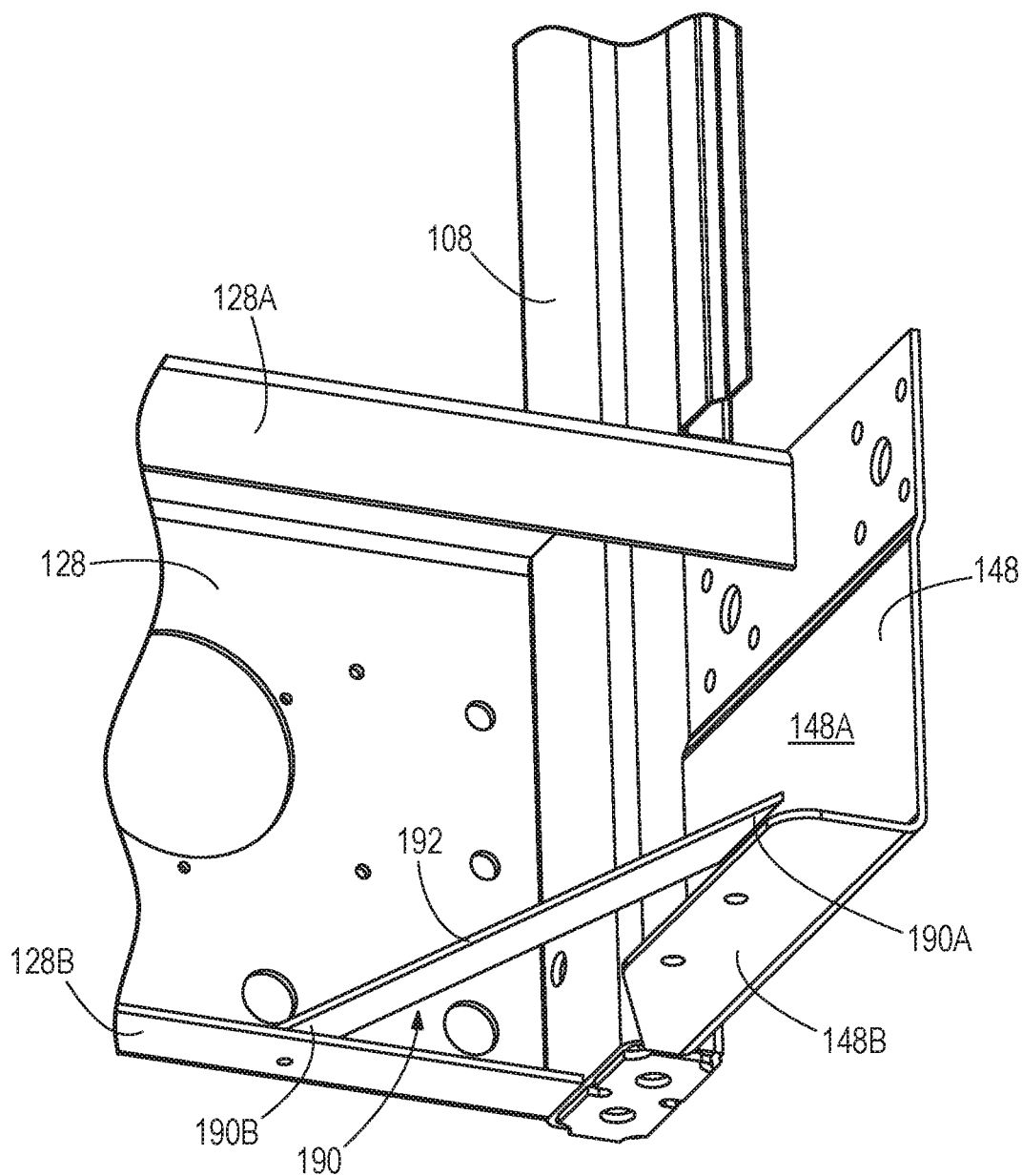
FIG. 15 is a perspective view of a lateral support member that extends along a horizontal plane between the corner gusset and the rear sill.

FIG. 15 illustrates a lateral reinforcement member 190 that provides supplemental lateral structural support for the corner gusset 148 in the event of an impact to the rear impact guard of the trailer by extending in a laterally-inboard direction from an interior side of the corner gusset 148 to which it is secured. Although only one corner gusset 148 on one side of the trailer is shown in the drawings, it will be understood that lateral reinforcement members 190 are provided along both of the corner gussets 148, at opposite ends of the rear bolster 128. A first or laterally-outboard end 190A of the lateral reinforcement member 190 is secured to the corner gusset 148. As shown, the first end 190A can lie on the horizontally-extending surface of the transverse flange 148B of the corner gusset 148. The lateral reinforcement member 190 can be welded or bolted to the corner gusset 148 at the first end 190A. The lateral reinforcement member 190 has a leg 192 extending laterally inward from the first end 190A to a second or laterally-inboard end 190B of the lateral reinforcement member 190 secured at an inwardly-spaced connection point to the rear bolster 128. For example, the second end 190B of the lateral reinforcement member 190 can be secured (e.g., bolted or welded) to a lower return flange 128B of the rear bolster 128. Thus, the lateral reinforcement member 190 extends in a horizontal plane, perpendicular to the vertical rear frame post 108. The lateral reinforcement member 190 can be constructed of sheet metal or plate or bar stock that is cut to length, and optionally shaped. The lateral reinforcement member 190 provides a truss effect, providing an in-plane tensioning strap, that reinforces the corner gusset 148 to inhibit the corner gusset 148 from rolling or folding over during a rear impact. The lateral reinforcement member 190 allows reinforcement of the corner gusset 148 without any direct connection to any of the cross-members 112 in the trailer floor. Thus, the rear frame structure and the floor can be manufactured and assembled as separate sub-assemblies. In some constructions, the lateral reinforcement member 190 may have one or more connections with the adjacent outboard post 136, such as the gusset 145 thereof. In some constructions, one or both of the ends 190A, 190B of the lateral reinforcement member 190 may have shared connection points (e.g., bolted joints) that provide connections between the outboard post 136 and one or both of the rear bolster 128 and the corner gusset 148.

Figure 16:
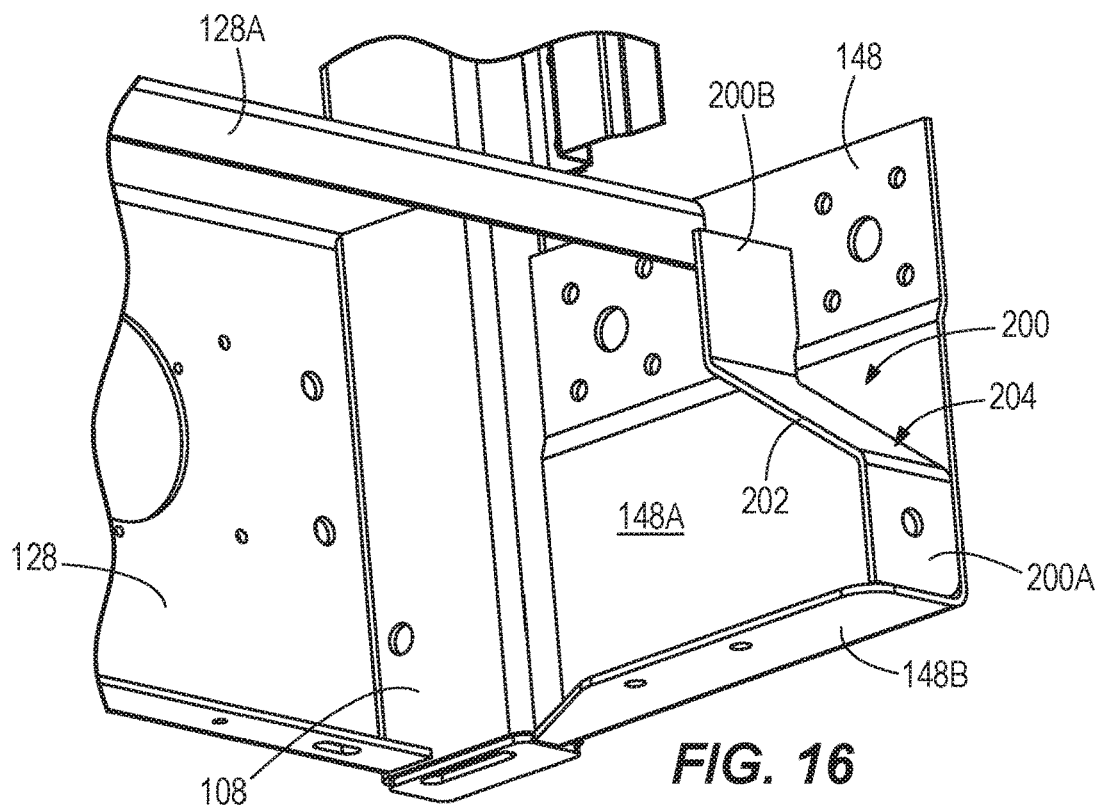
FIGS. 16 and 17 are perspective views of a lateral support member that extends along the inside of the corner gusset to the rear sill.
Figure 17:
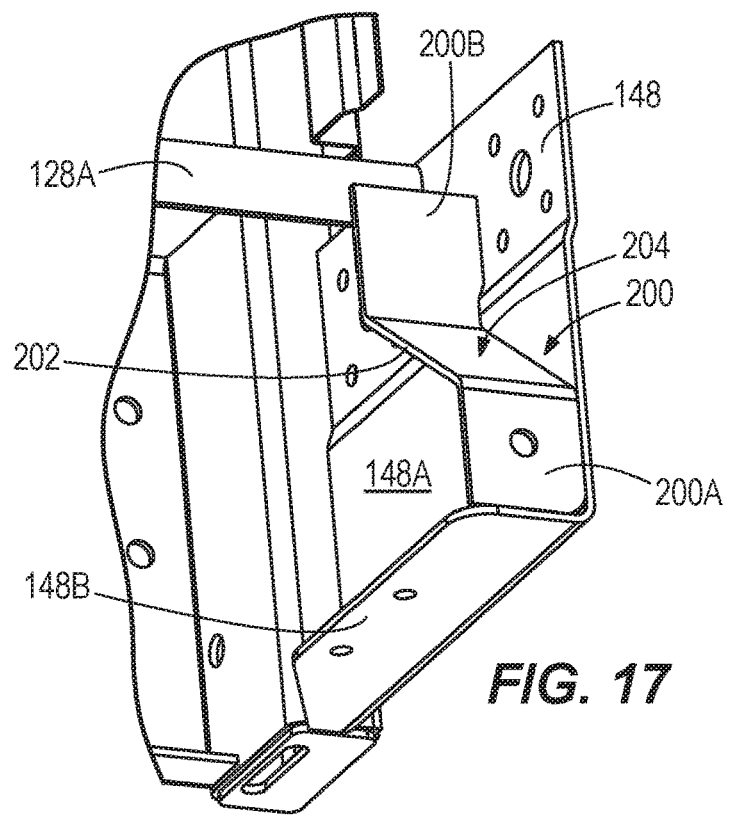

FIGS. 16 and 17 illustrate a lateral reinforcement member 200 that provides supplemental lateral structural support for the corner gusset 148 in the event of an impact to the rear impact guard of the trailer by extending in a laterally-inboard direction from an interior side of the corner gusset 148 to which it is secured. Although only one corner gusset 148 on one side of the trailer is shown in the drawings, it will be understood that lateral reinforcement members 200 are provided along both of the corner gussets 148, at opposite ends of the rear bolster 128. A first or lower end 200A of the lateral reinforcement member 200 is secured to the corner gusset 148. As shown, the first end 200A can have edges that extend along both the vertically-extending inward-facing surface 148A and a horizontally-extending surface of the transverse flange 148B. The first end 200A of the lateral reinforcement member 200 can be welded to the corner gusset 148 along its edges. A mounting hole in the first end 200A can also be provided for alignment with a mounting hole in a tab or gusset (not shown) extending laterally-inwardly from one of the primary reinforcement members 170, 170A so that the lateral reinforcement member 200 can be fastened (e.g., bolted) to the primary reinforcement member. The lateral reinforcement member 200 has a leg 202 extending along the inward-facing surface 148A from the first end 200A to a second or upper end 200B of the lateral reinforcement member 200 secured (e.g., by welding) at a vertically-higher connection point to the inward-facing surface 148, and optionally to a distal end of the upper return flange 128A of the rear bolster 128. In some constructions, an entire edge 204 of the lateral reinforcement member 200 from the first end 200A to the second end 200B can abut the inward facing surface 148A. of the corner gusset 148, and one or more welds may secure the lateral reinforcement member 200 to the corner gusset 148 along the edge 204. The lateral reinforcement member 200 can extend along a majority of a vertical extent of the corner gusset 148. A portion of the lateral reinforcement member 200 can extend above a bottom edge 104A of the bottom rail 104, and a portion of the lateral reinforcement member 200 can extend below the bottom edge 104A of the bottom rail 104. The lateral reinforcement member 200 can be constructed of sheet metal that is cut into shape and bent into the form shown. The above-mentioned edges are formed by a sheet thickness of the material forming the lateral reinforcement member 200. The lateral reinforcement member 200 serves as a transverse rib that reinforces the corner gusset 148 to inhibit the corner gusset 148 from rolling or folding over during a rear impact. The lateral reinforcement member 200 allows reinforcement of the corner gusset 148 without any direct connection to any of the cross-members 112 in the trailer floor. Thus, the rear frame structure and the floor can be manufactured and assembled as separate sub-assemblies.

Figure 18:
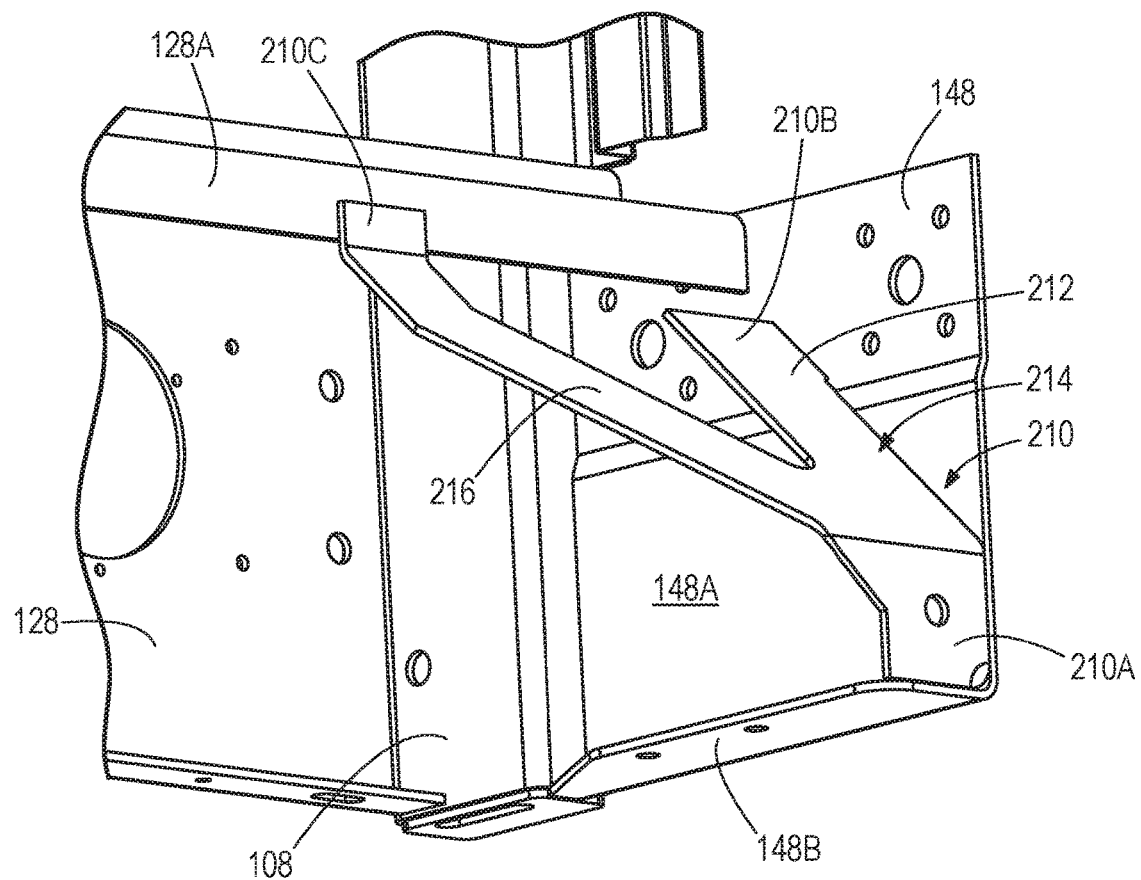
FIG. 18 is a perspective view illustrating a lateral support member that combines aspects of the structure of FIGS. 13-14 with the structure of FIGS. 16-17.

FIG. 18 illustrates a lateral reinforcement member 210 that provides supplemental lateral structural support for the corner gusset 148 in the event of an impact to the rear impact guard of the trailer by extending in a laterally-inboard direction from an interior side of the corner gusset 148 to which it is secured. Although only one corner gusset 148 on one side of the trailer is shown in the drawings, it will be understood that lateral reinforcement members 210 are provided along both of the corner gussets 148, at opposite ends of the rear bolster 128. The lateral reinforcement member 210 incorporates features of both FIGS. 13-14 and FIGS. 16-17. A first or lower and laterally-outboard end 210A of the lateral reinforcement member 210 is secured to the corner gusset 148. As shown, the first end 210A can have edges that extend along both the vertically-extending inward-facing surface 148A and a horizontally-extending surface of the transverse flange 148B. The first end 210A of the lateral reinforcement member 210 can be welded to the corner gusset 148 along its edges. A mounting hole in the first end 210A can also be provided for alignment with a mounting hole in a tab or gusset (not shown) extending laterally-inwardly from one of the primary reinforcement members 170, 170A so that the lateral reinforcement member 210 can be fastened (e.g., bolted) to the primary reinforcement member. The lateral reinforcement member 210 has a first leg 212 extending along the inward-facing surface 148A from the first end 210A to a second end 210B of the lateral reinforcement member 210 secured (e.g., by welding) at a vertically-higher connection point to the inward-facing surface 148, and optionally to a distal end of the upper return flange 128A of the rear bolster 128 (although not shown). In some constructions, an entire edge 214 of the lateral reinforcement member 210 from the first end 210A to the second end 210B can abut the inward facing surface 148A of the corner gusset 148, and one or more welds may secure the lateral reinforcement member 210 to the corner gusset 148 along the edge 214. The lateral reinforcement member 210 further includes a third end spaced laterally inward from the first and second ends 210A, 210B by a second leg 216. The third end 210C can provide a laterally-inboard connection point at which the lateral reinforcement member 210 is secured (e.g., by welding or a bolt) to an upper return flange 128A of the rear bolster 128. The lateral reinforcement member 210 can be constructed of sheet metal that is cut into shape and bent into the form shown. The lateral reinforcement member 210 provides both a rib effect and a truss effect to support the corner gusset 148.

FIGS. 20-25 illustrate another embodiment of an outboard corner post 236 for a trailer rear impact guard. It will be understood that, while one corner post 236 is illustrated, the features shown and described may be utilized at both lateral sides of the rear impact guard (e.g., where the second corner post is a mirror image of the corner post 236 shown). The outboard corner post 236 is a bolt-on post that utilizes a removable, non-permanent connection at its lower end to the bumper 124. In other words, the post 236 is not welded or fused to the bumper 124. Similarly, the upper end of the post 236 utilizes a removable, non-permanent connection to the rear of the trailer frame such that the post 236 is not welded or fused to any portion thereof. One or more inboard posts between the outboard posts 236 may also be provided, each extending from the rear bolster 128 to the bumper 124. If the inboard post(s) are also provided with non-permanent connections to the trailer frame and the bumper 124, the bumper can be a serviceable item that is replaceable without replacing any other portion of the rear impact guard. Further, the entire rear impact guard can be manufactured and assembled as a sub-assembly, separate from and attachable to the trailer frame. To the extent necessary, the rear impact guard as a whole can be a serviceable item that is replaceable without the need for any destructive means to separate the posts from the trailer frame. While not required in all constructions, a rear-most panel 240 of the outboard post 236 is provided with one or more (e.g., two) apertures that reduce the overall weight of the post 236. The illustrated layout of the apertures is only one exemplary embodiment, and the apertures can vary in number and layout. In some constructions, the aperture(s) define a cumulative area that is more than 20 percent, more than 30 percent, or even more than 40 percent of a total area of the panel 240 defined by its total periphery.

Figure 23:
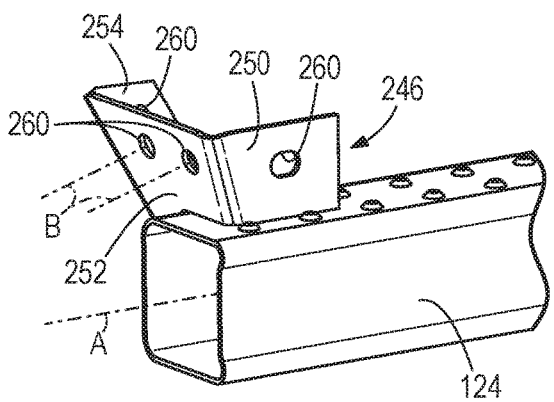
FIG. 23 is a perspective view of the bumper and the mounting bracket of the rear impact guard of FIG. 20.
Figure 24:
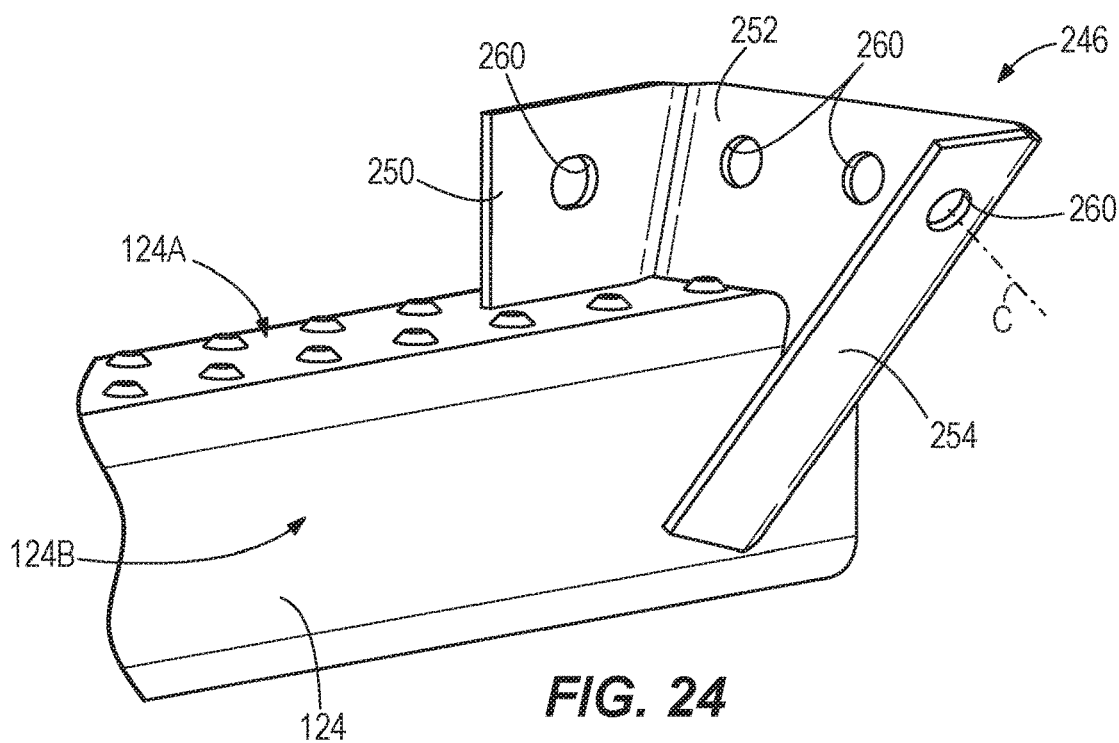
FIG. 24 is an alternate perspective view of the bumper and the mounting bracket of the rear impact guard of FIG. 20
Figure 25:
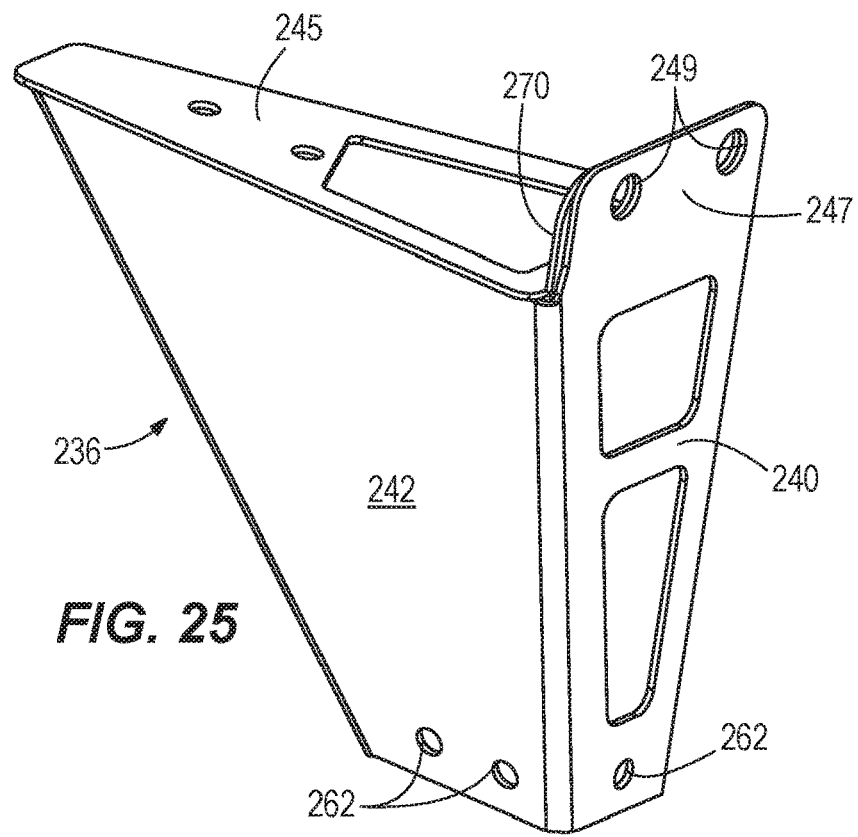
FIG. 25 is a perspective view of the corner post of the rear impact guard of FIG. 20.

Although the bumper 124 can be provided by a hollow tubular member having a uniform cross-section along its axis A as shown, a stem or mounting bracket 246 can be secured to an outer surface of the bumper 124 to provide mounting locations for attaching the lower end of the post 236. Multiple mounting locations are provided by the mounting bracket 246 (e.g., holes for receiving removable fasteners such as bolts), The mounting bracket 246 can be form-fitting around multiple surfaces of the bumper 124 and constructed to protrude therefrom. For example, the mounting bracket 246 can wrap around both a top side 124A and a front side 124B of the bumper 124 as shown in FIG. 24. The mounting bracket 246 can be welded to the outer surface(s) of the tube forming the bumper 124, thus forming a bumper assembly or weldment. As noted in FIGS. 22-24, the mounting bracket 246 can include multiple non-planar panels 250, 252, 254 that respectively align with the multiple panels 240, 242, 244 of the outboard post 236 to lie surface-on-surface therewith. As shown, three panels are provided, but more or fewer panels may be provided in other constructions. Each of the panels 250, 252, 254 has at least one mounting hole 260, and the laterally-outboard panel 252 includes two mounting holes 260, arranged side-by-side. The mounting holes 260 of the mounting bracket 246 correspond to an identical arrangement of mounting holes 262 on the panels 240, 242, 244 of the post 236. In some constructions, not all of the panels 240, 242, 244, 250, 252, 254 include mounting holes. For example, in some constructions, the mounting holes 260, 262 in the forward-most panels 244, 254 are omitted.

Although the rear-most panels 240, 250 of the post 236 and the mounting bracket 246 extend vertically to define a vertical surface-to-surface interface, there is at least one non-vertical surface-to-surface interface defined between the post 236 and the mounting bracket 246, In an upward direction from the bumper 124, the laterally-outboard panels 242, 252 extend further laterally outboard to form an acute angle with the bumper axis A. As such, the panels 242, 252 are oblique to the axis A. As shown in FIG. 23, the mounting holes 260 in the laterally-outboard panel 252 define respective parallel axes B (extending centrally through the holes 260, perpendicular to the panel 252), both of which are oblique to the horizontal bumper axis A. As shown in FIG. 24, the mounting hole 260 in the forward-most panel 254 defines an axis C (extending centrally through the hole 260, perpendicular to the panel 254), which is oblique to the horizontal bumper axis A. When the post 236 is assembled with the mounting bracket 246, the mounting holes 262 of the post 236 align with the mounting holes 260 and assume the same orientations as described above. The respective axes B, C define the axes along which respective bolts (not shown) are inserted to join the post 236 to the mounting bracket 246.

Another feature of the post 236 of FIGS. 20-25 is a supplementary or back-up plate 270 at the top end of the post 236. The back-up plate 270 lies directly alongside the rearmost panel 240 in the upper area defining the mounting location or flange 247. The flange 247 and the back-up plate 270 jointly form a pair of mounting holes 249 for connection to the trailer frame. The back-up plate 270 reduces the tear-out stress around the bolts during an impact, inhibiting the bolts from tearing out of the flange 247. The added strength is provided across the flange 247 without incurring a weight penalty that would accompany the use of a thicker sheet for the entire panel 240.

It should be noted that the posts 136, 236 disclosed herein can be constructed with one or more additional panels beyond the three-panel construction shown. For example, the disclosed corner posts 136, 236 or modified variants thereof can be provided with an extended wrap-around flange forming a fourth panel that extends alongside the forward-most panel 144, 244, at an angle therewith. The fourth panel can extend in an at least partially rearward direction, and one example of such a fourth panel 161 is shown in dashed lines in FIG. 4. Likewise is the case for the mounting bracket 246, which can feature another panel alongside the forward-most panel 254. The fourth panel can extend The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A rear impact guard for attachment to a rear frame portion of a trailer, the rear impact guard comprising:
    a bumper extending along an axis defining a first direction to be oriented transversely to span laterally at a distance below the rear frame portion;
    a pair of outboard posts extending from respective opposed distal ends of the bumper in a second direction so that the bumper can be spaced below the rear frame portion by the pair of outboard posts; and
    at least one inboard post extending from the bumper at a location between the pair of outboard posts,
    wherein each of the pair of outboard posts has a lower end that overlaps with a respective mounting bracket that protrudes upwardly from the bumper such that mounting holes of the outboard posts align with mounting holes of the mounting brackets, and
    wherein each mounting bracket has a laterally-outboard panel that extends obliquely from the bumper in a direction with a laterally-outward component.

2. The rear impact guard of claim 1, wherein each of the mounting brackets is welded to the bumper.

3. The rear impact guard of claim 1, wherein each mounting bracket includes a forward panel, a rearward panel, and a laterally-outward panel connecting the forward and rearward panels, and each mounting bracket is open in a laterally-inward direction.

4. The rear impact guard of claim 1, wherein each mounting bracket includes a forward panel, a rearward panel, and a laterally-outward panel connecting the forward and rearward panels, and wherein each of the forward, rearward, and laterally-outward panels includes at least one mounting hole.

5. The rear impact guard of claim 1, wherein the bumper has a hollow rectangular construction in a cross-section perpendicular to the axis.

6. The rear impact guard of claim 1, wherein each of the mounting brackets wraps around both a front side and a top side of the bumper.

7. The rear impact guard of claim 1, wherein each of the pair of outboard posts includes a plurality of panels all having first ends extending from the mounting bracket on the bumper, and wherein a top gusset extends parallel to the axis between the plurality of panels at opposite second ends thereof to provide an upper surface for abutment with the rear frame portion.

8. The rear impact guard of claim 1, wherein an upper portion of each of the outboard posts includes apertures for establishing non-permanent, removable connections to the rear frame portion.

9. The rear impact guard of claim 8, wherein the apertures of the upper portions of each of the outboard posts include at least one aperture oriented to receive a fastener along a first perpendicular direction with respect to the axis defined by the bumper, and at least one aperture oriented to receive a fastener along a second perpendicular direction with respect to the axis defined by the bumper.

10. The rear impact guard of claim 8, wherein the apertures of the upper portions of each of the outboard posts include two apertures oriented to receive respective fasteners parallel to a first perpendicular direction with respect to the axis defined by the bumper, and two apertures oriented to receive respective fasteners parallel to a second perpendicular direction with respect to the axis defined by the bumper.

11. A trailer comprising:
    a front end provided for attachment to a truck;
    a rear end spaced in a longitudinal direction from the front end to define a cargo area between the front and rear ends:
    a frame including
        a pair of laterally spaced vertical corner posts at the rear end,
        a rear bolster extending transversely to the longitudinal direction below a bottom rear edge of the cargo area, between the pair of vertical corner posts, and
        a pair of corner gussets extending forwardly from respective bottom portions of the pair of vertical corner posts; and
    a rear impact guard including
        a bumper positioned at the rear end of the trailer and spaced below the rear bolster,
        a pair of outboard posts, each having a lower end secured to a distal end of the bumper and an upper end secured to a laterally outboard portion of the frame, and
        at least one inboard post extending between the bumper and the rear bolster at a location between the pair of outboard posts, wherein each of the pair of outboard posts includes a plurality of panels extending between the upper and lower ends, and a top gusset extending between and interconnecting the plurality of panels, the top gusset defining a top surface supporting a bottom of each of: the rear bolster, the respective one of the pair of vertical corner posts, and the respective one of the pair of corner gussets.

12. The trailer of claim 11, wherein the plurality of panels of each of the pair of outboard posts include three panels interconnected by the top gusset.

13. The trailer of claim 11, wherein each of the pair of outboard posts is secured to the frame of the trailer solely with non-permanent, removable connections.

14. The trailer of claim 11, wherein one of the plurality of panels of each of the pair of outboard posts is a rear panel provided with at least one aperture oriented to receive a fastener parallel to the longitudinal direction for securing to the rear bolster, and wherein the top gusset of each of the pair of outboard posts is provided with at least one aperture oriented to receive a fastener in a vertical direction parallel to the pair of vertical corner posts for securing to the respective one of the pair of corner gussets.

15. The trailer of claim 11, wherein the pair of corner gussets are fortified with respective lateral reinforcement members, each of which is secured to an interior side of a corresponding one of the pair of corner gussets and each of which extends laterally-inboard from the corresponding corner gusset.

16. The trailer of claim 15, wherein the top gusset of each of the pair of outboard posts extends to span underneath a position at which the respective lateral reinforcement member is joined with the respective corner gusset.

17. The trailer of claim 15, wherein each of the lateral reinforcement members has a leg extending laterally inward from the respective corner gusset to an inwardly-spaced connection point at which the lateral reinforcement member is secured to the rear bolster, and wherein each of the lateral reinforcement members has an additional leg elongated to extend along an inward-facing surface of the respective corner gusset.

18. The trailer of claim 15, wherein the lateral reinforcement members are secured, respectively, to inward-facing surfaces of the pair of corner gussets by welding.

19. The trailer of claim 18, wherein each of the lateral reinforcement members has an edge abutting and extending along the inward-facing surface of the respective corner gusset.

20. The trailer of claim 18, wherein each of the lateral reinforcement members has a leg extending laterally inward from the inward-facing surface of the respective corner gusset to an inwardly-spaced connection point at which the lateral reinforcement member is secured to the rear bolster.

* * * * *